US007295558B2

(12) United States Patent
Dubuc

(10) Patent No.: US 7,295,558 B2
(45) Date of Patent: *Nov. 13, 2007

(54) ATM ADAPTION LAYER TRAFFIC SCHEDULING

(75) Inventor: Ken Dubuc, Ottawa (CA)

(73) Assignee: Alcatel Canada Inc., Kanata (CA)

( * ) Notice: Subject to any disclaimer, the term of this patent is extended or adjusted under 35 U.S.C. 154(b) by 452 days.

This patent is subject to a terminal disclaimer.

(21) Appl. No.: 10/126,527

(22) Filed: Apr. 22, 2002

(65) Prior Publication Data

US 2002/0150046 A1  Oct. 17, 2002

Related U.S. Application Data

(63) Continuation of application No. 09/208,982, filed on Dec. 11, 1998, now Pat. No. 6,392,994.

(30) Foreign Application Priority Data

Mar. 30, 1998  (CA) ..................... 2233491

(51) Int. Cl.
*H04L 12/56* (2006.01)
(52) U.S. Cl. .................. 370/395.41; 371/468; 371/537
(58) Field of Classification Search ................ 370/230, 370/395.1, 231, 232, 233, 234, 235, 236, 370/237, 387, 388, 389, 391, 392, 394, 396, 370/395.21, 395.4, 401, 468, 474, 537, 538
See application file for complete search history.

(56) References Cited

U.S. PATENT DOCUMENTS 5,533,020 A  7/1996  Byrn et al.

| 5,687,167 | A |   | 11/1997 | Bertin et al. |
| 5,838,681 | A |   | 11/1998 | Bonomi et al. |
| 5,889,779 | A |   | 3/1999  | Lincoln |
| 5,987,031 | A |   | 11/1999 | Miller et al. |
| 6,003,062 | A |   | 12/1999 | Greenberg et al. |
| 6,041,039 | A |   | 3/2000  | Kilkki et al. |
| 6,081,513 | A | * | 6/2000  | Roy ..................... 370/260 |

(Continued)

OTHER PUBLICATIONS

Tranchier, D. P. et al., "Fast Bandwidth Allocation in ATM Networks", Proceedings of the International Switching Symposium, Tokyo, Japan, IEICE, vol. AYMP. 14, Oct. 25, 1992, pates 7-11, XP000337692.

(Continued)

*Primary Examiner*—Brian Nguyen
(74) *Attorney, Agent, or Firm*—McCarthy Tetrault LLP

(57) ABSTRACT

The ATM transmitting apparatus for transmitting messages, such as frame relay packets, associated with a plurality of connections comprises ATM layer transmission equipment for receiving multiple messages, segmenting each received message into a plurality of smaller data units, such as 48 byte AAL SAR protocol data units, and multiplexing such data units into a single stream for transport over a physical interface. A scheduler receives messages from each of the connections and transfers the messages to the transmission equipment. The scheduler can dynamically set a transmission rate for any connection, and allocates each connection whose message is transferred to the transmission equipment a substantially maximal amount of bandwidth at any given time during the transmission of the message, to thereby minimize interleaving of data units from the various connections and reduce the average latency (per unit of message) in transmitting the messages across a network.

32 Claims, 13 Drawing Sheets

U.S. PATENT DOCUMENTS 6,205,152 B1 3/2001 Von Ahnen et al.
6,240,066 B1* 5/2001 Nagarajan et al. .......... 370/230
6,272,109 B1* 8/2001 Pei et al. .................... 370/230
6,304,549 B1* 10/2001 Srinivasan et al. ......... 370/230
6,392,994 B1* 5/2002 Dubuc ........................ 370/230

OTHER PUBLICATIONS

Xie, G. G. et al., "Real-Time Block Transfer Under a Link-Sharing Hierarchy", IEEE/ACM Transactions on Networking, IEEE Inc., New York, United States, vol. 6, No. 1, Feb. 1, 1998, pp. 30-41, XP000733549.

* cited by examiner

| VC | SDU request time | Number of PDUs in SDU | PCR | Round-robin latency | Scheduling sublayer latency |
|---|---|---|---|---|---|
| 1 | 0 | 3 | 50% | 10.5 | 6 |
| 2 | 0 | 2 | 33% | 8 | 6 |
| 3 | 0 | 4 | 25% | 16 | 18 |
| 4 | 0 | 3 | 75% | 10.5 | 10 |
| Average latency | | | | 11.9 | 11 |
Fig. 8
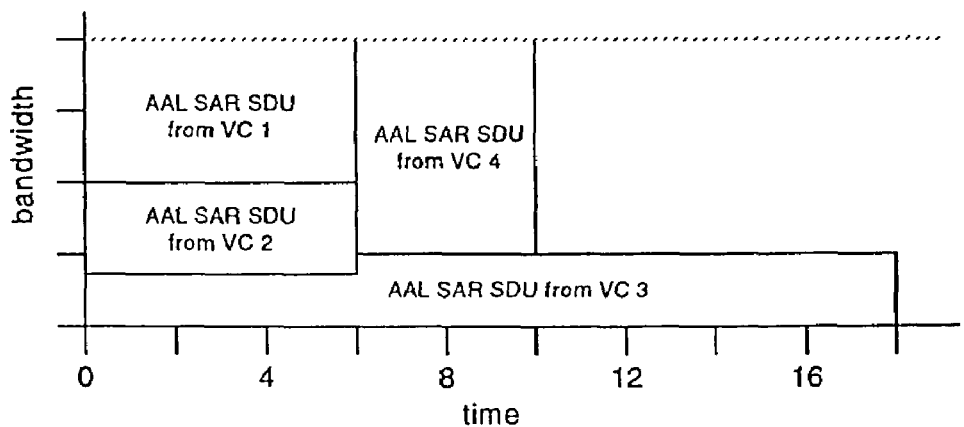
Fig. 9
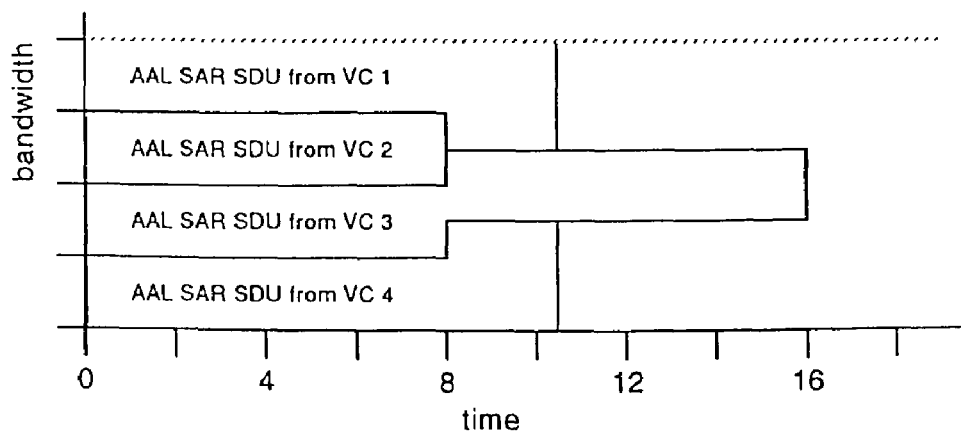
Fig. 10

ATM ADAPTION LAYER TRAFFIC SCHEDULING

This application is a continuation of U.S. patent application Ser. No. 09/208,982 filed Dec. 11, 1998, now U.S. Pat. No. 6,392,994.

FIELD OF INVENTION

The invention relates generally to the art of digital communications and more specifically to a system for minimizing the average latency in transporting messages, such as packets or frames, which are segmented into a plurality of smaller cells for transport across a network.

BACKGROUND OF INVENTION

Asynchronous transfer mode (hereinafter "ATM") service inter-networking protocols enable data or messages formatted according to a non-ATM data communication protocol to be transported across an ATM network. For example, the Frame Relay Forum FRF.5 protocol specifies how a relatively large, variable length, frame relay packet should be segmented into a plurality of ATM-like, fixed-size, cells for transport across an ATM network. Such protocols necessarily define how the ATM Adaption Layer (AAL) should be provisioned since this layer of the ATM/B-ISDN protocol stack, as defined by ITU Recommendation I.321 and shown in FIG. 1, is responsible for adapting the services provided by the ATM Layer, which provides basic ATM cell transport functions, to higher layers, e.g. frame relay bearer service.

FIG. 2 illustrates a generic version of the AAL in greater detail. As shown in FIG. 2, some versions of the AAL, such as AAL3/4 and AAL5, include a convergence sublayer (CS) and a segmentation and reassembly sublayer (SAR). The CS, which sits directly above the SAR and below the AAL Service Access Point (SAP), aligns the SDUs and adds overhead information. The CS may also provide service specific signalling or data link functions.

The SAR, when operating in a message mode, segments a single AAL SAR Service Data Unit (hereinafter "SDU"), such as a variable length frame packet, into a plurality of AAL SAR Protocol Data Units (hereinafter "PDU"), each of which essentially forms the payload of an ATM cell transmitted across an ATM network. Conversely, at the destination, the destination SAR requires that all of the PDUs composing an SDU be passed from the ATM Layer to the destination SAR before it can reassemble the SDU and, ignoring the role of the convergence sublayer, indicate reception of the SDU to the higher layer using the AAL. Thus, the latency in transmitting an SDU from a first point to a second point in a network can be defined as the time from which the transmission of the SDU is first requested until the time the last PDU arrives at the destination SAR and the SDU is reassembled. In other words, latency can be defined as the time required to transmit the SDU from an originating AAL SAP to a destination AAL SAP. This latency is entirely characterized by the amount of time required to propagate the last PDU of an SDU across the ATM network—the time required to propagate any other PDU before the last PDU of an SDU is of no consequence at the destination AAL SAP.

Latency manifests itself as sluggishness or slow response time in interactive-type communications. For example, if one were sending joystick instructions across a network during the course of an interactive game played there over, a long latency would, in the absence of other aggravating factors, result in a noticeable time period between the physical movement of the joystick and the corresponding computer action. Accordingly, it is desirable to minimize latency for interactive telecommunications applications.

Latency is affected by the service discipline used to schedule or multiplex PDUs corresponding to SDUs from a plurality of virtual connections (VCs) into a single cell stream for transmission across the Physical Layer (PHY) of the ATM network. FIG. 3 shows how an ATM Layer 11 provides a SAP 10 to each of several VCs, each of which has its own AAL 12 (i.e., the AAL is invoked in parallel instances). The ATM Layer 11, in turn, uses a single SAP 14 into a PHY 16. One role of the ATM Layer 11 is to accept requests of PDUs 17 from each SAP 10 and to multiplex these PDUs into a single cell stream 18 such that the timing of the transmission of each of the PDUs conforms to predetermined traffic parameters assigned to its respective VC.

FIG. 3 illustrates a condition where each VC generates a burst 20 of several ATM PDU requests at the ATM SAP 10, wherein each such burst corresponds to a single SDU 22, such that there is an overlap in the transmission periods of the SAR SDUs from the ATM Layer 11 to the PHY 16. The ATM PDUs 17 received from the ATM SAP 10 must therefore be queued, and then the ATM PDUs from each of the different ATM SAPs 10 must be multiplexed in some order onto the single stream 18 of ATM PDUs passed to the PHY SAP 14. Given this set of PDUs which have been requested over several ATM Layer SAPs 10, and subject to the constraints of satisfying the traffic parameters of each VC, it is often desired to minimize the average amount of latency experienced per unit of SDU data (i.e., per PDU) for various types of ATM service categories.

As shown in FIG. 3, a typical ATM Layer implementation might use round-robin ordering in sending the PDUs 17 to the PHY SAP 14 from each ATM SAP 10. This would result in each corresponding SDU 22 using an equal fraction of the PHY bandwidth while the PDUs for each SDU are being transmitted. This is shown, for instance, in the bandwidth occupancy chart of FIG. 4A for the situation where two VCs each request a burst of the same number of PDUs at about the same time, wherein each VC has a PCR equal to 100% of the available bandwidth. (A "bandwidth occupancy chart" is a chart with time on the horizontal axis, and bandwidth on the vertical axis. Each SDU sent on an ATM virtual connection is shown as a shaded region on such a chart. The net height of the region at a particular time shows the amount of bandwidth occupied by the transmission of the SDU at that time; the leftmost and rightmost extent of the region gives the time at which the first and last PDUs for the SDU are transmitted, respectively, and the total area of the region gives the size of the SDU. Unshaded regions in these charts represent the proportion of unused PRY bandwidth, for which the ATM Layer will be sending idle cells.) This ordering is not optimal with respect to the average amount of latency experienced per unit of SDU data.

SUMMARY OF INVENTION

Broadly speaking, the invention seeks to minimize or reduce the average per unit latency in transporting messages which are decomposed into a plurality of smaller data units for transport across a network.

One aspect of the invention relates to an apparatus for transmitting messages associated with a plurality of connections. The apparatus comprises transmission equipment for receiving multiple messages, segmenting each received message into one or more data units, and multiplexing such data units from various connections into a single stream for transport over a physical interface at an output transmission rate. A bandwidth allocation means is associated with the transmission equipment for dynamically allocating a portion of the output transmission rate to any connection. A scheduler is connected to the bandwidth allocation means for scheduling the transfer of messages to the single stream of the transmission equipment and for allocating a substantially maximum permissible portion of the output transmission rate to each connection substantially at the time its message is transferred to the transmission equipment in order to minimize interleaving of data units from various connections.

The transmission equipment preferably comprises a segmentation means and a multiplexing means for respectively segmenting each received message into the aforesaid data units and multiplexing same to the single stream of data units associated with the transmission equipment. The scheduler preferably transfers messages to the single stream by receiving the messages directly from higher layer networking services and transferring the messages to the segmentation means which, in turn, substantially immediately transfers the messages to the multiplexing means. Alternatively, the scheduler transfers messages to the single stream by receiving the data units from the segmentation means and transferring groups of data units to the multiplexing means, wherein each such group corresponds to a message.

The scheduler is also preferably enabled to additionally set the transmission rate for each connection whose message is in the process of being transmitted to the maximum permissible portion of the output transmission rate during the message transmission. The maximum permissible portion of the output transmission rate for a given connection at any given time is the lessor of (i) a pre-specified peak transmission rate for the given connection and (ii) all unused bandwidth at the given time allocated to a service class to which the given connection belongs.

The scheduler, upon reception of a given message associated with a given connection, is also preferably enabled to transfer the given message to the single stream of data units provided free bandwidth is available for the given connection and provided that the given connection does not have a previous message in the process of being transmitted by the transmission equipment. In the event no free bandwidth is available for the given connection or in the event that the given connection has a previous message in the process of being transmitted by the transmission equipment, the scheduler is enabled to queue the given message at the end of a queue of pending data messages.

The apparatus also preferably includes indication means, connected to the scheduler, for indicating when a last data unit of a message has been transmitted by the transmission equipment. When the indication means is actuated, the scheduler is enabled to increase the transmission rate of any connection in the process of having a message being transmitted by the transmission equipment provided that free bandwidth is available for the given connection.

A preferred embodiment of the invention relates to an ATM communications device wherein the messages are ATM adaption layer (AAL) service data units (SDUs) associated with a plurality of virtual circuit connections. The data units are AAL segmentation and reassembly protocol data units (SAR PDUs). The transmission equipment preferably comprises segmentation means for segmenting each AAL SDU into one or more SAR PDUs, ATM layer means for multiplexing the SAR PDUs of various connections into a single stream having an output transmission rate, and physical transmission means, connected to the ATM layer means, for transporting the single stream of SAR PDUs over a physical interface. In the preferred embodiment, bandwidth allocation means are provided to dynamically allocate a portion of the output transmission rate to any connection. The scheduler, which is connected to the bandwidth allocation means, is responsible for scheduling the transfer of SDUs to the ATM layer means and for allocating a substantially maximum permissible portion of the output transmission rate to each connection substantially at the time its SDU is submitted to the ATM layer means in order to minimize interleaving of SAR PDUs from various connections in the single stream. The scheduler also preferably allocates a maximal portion of the output transmission rate to a connection while an SDU associated therewith is in the process of being transmitted by the ATM layer means. The scheduler transfers SDUs to the ATM layer means by receiving the SDUs from AAL users and transferring the SDUs to the segmentation means which substantially immediately transfers the SAR PDUs to the ATM layer means. Alternatively, the scheduler may transfer SDUs to the ATM layer means by transferring groups of SAR PDUs to the ATM layer means, wherein each such group corresponds to an SDU.

Another aspect of the invention provides a data transmission method for transporting multiple messages associated with multiple connections over a network. The method comprises the steps of: (a) segmenting each message of each connection into transportable data units; (b) scheduling the transfer of messages from the multiple connections to a multiplexing step; (c) multiplexing the data units from various connections into a single stream for transport over a transmission media to a destination; and (d) assigning a maximum permissible amount of transmission media bandwidth to each connection at the time a message thereof substantially begins to be transported over the transmission media, thereby minimizing interleaving of data units from the multiple connections over the transmission media. The method also preferably includes the step of setting the bandwidth for a connection whose message is in the process of being transmitted to the maximum permissible amount during the transmission of the message.

BRIEF DESCRIPTION OF DRAWINGS

For the purposes of description, but not of limitation, the foregoing and other aspects of the invention are explained in greater detail with reference to the accompanying drawings, wherein:

FIG. 8 is a table exemplifying average latency in transmitting SDUs using the first preferred method and using a prior art round-robin multiplexing scheme;

FIG. 9 is a bandwidth occupancy chart corresponding to the example in FIG. 8 where SDUs are transmitted using the first preferred method;

FIG. 10 is a bandwidth occupancy chart corresponding to the example in FIG. 8 where SDUs are transmitted using the prior art round-robin multiplexing scheme;

DETAILED DESCRIPTION OF PREFERRED EMBODIMENTS

The detailed description is divided into two parts. The first part discloses a preferred embodiment for minimizing the average latency per unit of AAL SDU data in relation to ATM service classes such as the available bit rate (ABR) and unspecified bit rate (UBR) service categories which are characterized by a peak cell rate (PCR) traffic management parameter. The second part discloses a preferred embodiment for minimizing the average latency per unit of AAL SDU data in relation to ATM service classes such as non-real-time VBR which are characterized by peak cell rate (PCR), sustained cell rate (SCR), and maximum burst size (MBS) traffic management parameters. As will become apparent, the second embodiment builds upon the first embodiment.

Service Classed Characterized by PCR

Figure 5:
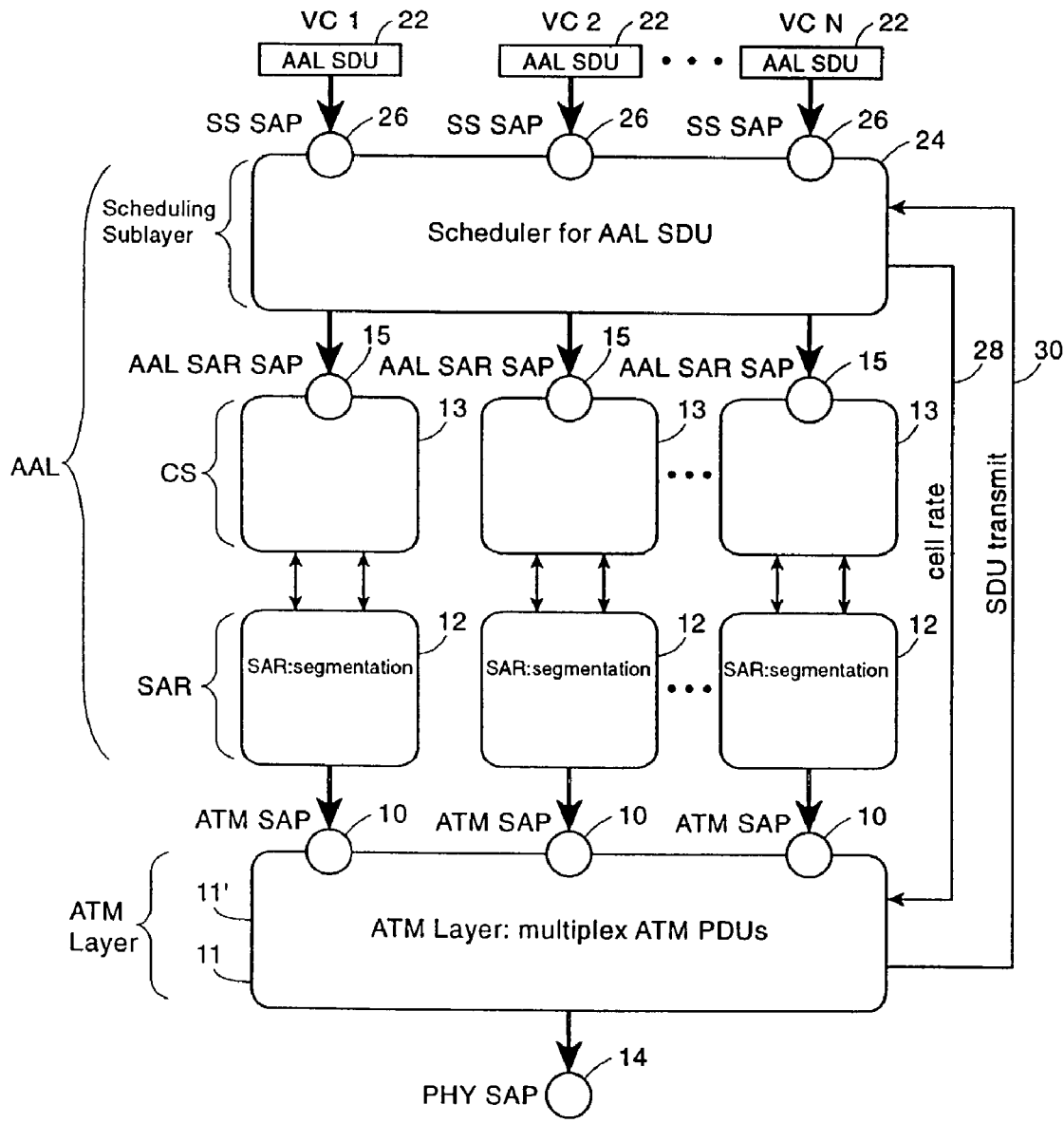
FIG. 5 is a protocol diagram illustrating the structure of the AAL in accordance with a first preferred embodiment of the invention which includes an SDU scheduling sublayer.

FIG. 5 illustrates the structure of an AAL in accordance with the preferred embodiment. In addition to the known SAR layer 12 and CS layer 13 (which is not explicitly shown in FIG. 3), the preferred AAL includes a scheduling means, such as scheduling sublayer 24 (alternatively referred to as "SS"), located above the CS/SAR layers for scheduling or ordering the transfer of SDUs to the CS/SAR. (In alternative embodiments, scheduling sublayer 24 may be placed above the SAR but below the CS.)

The scheduling sublayer 24 provides a plurality of SS SAPs 26, one for each VC associated with PHY SAP 14. The scheduling sublayer 24 accepts AAL SDUs 22 in data requests from higher layers of the ATM protocol stack (hereinafter "AAL user"). In the preferred embodiment, the AAL user uses the same data request to the scheduling sublayer at SS SAPs 26 as the AAL user would in the prior art for direct access to the AAL SAR SAP 15. The scheduling sublayer 24, in turn, preferably communicates with the SAR 12 using prior art AAL SAR SAP 15. As will be described in greater detail below, the scheduling sublayer 24 affects only the egress data path (from AAL user to PHY) of SDUs 22, but not the ingress data path (from PHY to AAL user).

The scheduling sublayer 24 also communicates directly with the ATM Layer 11 through a cell rate specification signal 28 and an SDU transmission signal 30. The cell rate signal 28 enables the scheduling sublayer 24 to specify a constant cell rate or period for any given VC to conventional ATM Layer equipment 11' which, as known per se, provides this capability. The SDU transmission signal 30 enables the ATM Layer equipment 11' to inform (such as by way of a software interrupt) the scheduling sublayer 24 when a last PDU of any given SDU 22 and VC has been transmitted. This capability is also provided by conventional ATM Layer equipment 11', as known in the art per se, based upon examination of certain control bits in the PDU or when the equipment no longer has any cells to send for a particular connection.

The scheduling sublayer 24 is provided with data regarding the traffic parameters, such as the PCR, and current transmit state of each VC; information which is typically known by the ATM Layer but not the CS/SAR. The scheduling sublayer 24 is also provided with data regarding SDU boundaries; information which is typically known by the CS/SAR but not the ATM Layer. This data is collectively used by the scheduling sublayer 24 to control the time at which SDUs 22 are passed to the CS/SAR, and to specify a constant cell rate for a given VC at the ATM Layer 11.

The scheduling sublayer 24 attempts to minimize the effects of the ATM Layer 11 which interleaves PDUs associated with various VCs in round-robin fashion for transport through PHY SAP 14. This is accomplished by transferring the AAL SDUs of VCs to the CS/SAR layers on a substantially relative first-come, first-served basis (of VCs making data requests at SS SAPs 26) subject to the constraints that: (a) the PHY bandwidth consumed by the VCs are maximized within the limits of the bandwidth preallocated to their respective service classes; (b) the traffic parameters for each VC are satisfied; and (c) the SDUs, and the PDUs thereof, of any given VC be transmitted across PHY SAP 14 in sequential order so as to prevent misinsertion at the destination. This approach attempts to minimize the average transmission latency encountered by the AAL SDUs 22.

Figure 4A:
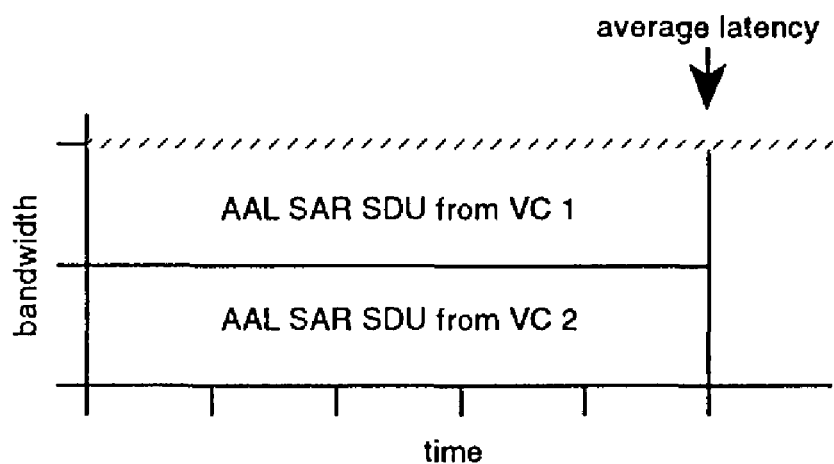
FIG. 4A is a bandwidth occupancy chart illustrating the average latency in the transmission of SDUs from two virtual circuits using the round-robin scheduling discipline depicted in FIG. 3.
Figure 4B:
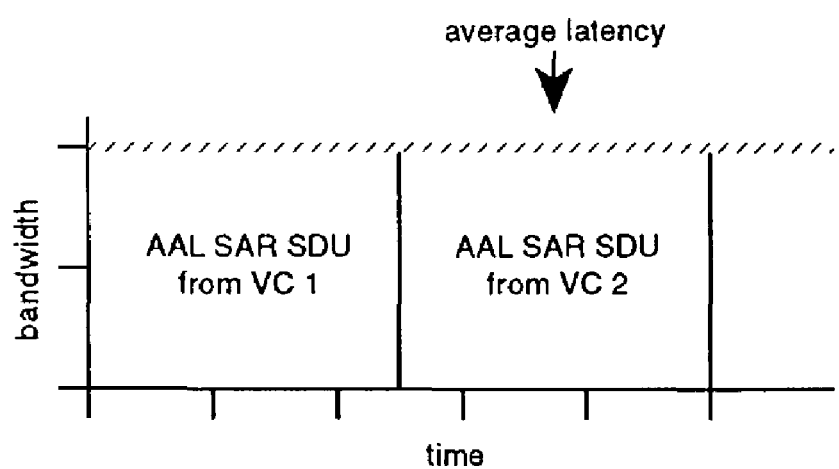
FIG. 4B is a bandwidth occupancy chart exemplifying the average latency in the transmission of SDUs from two virtual circuits using apparatus according to one aspect of the invention.

The potential results in accordance with this approach are simplistically illustrated in FIG. 4B for the situation, corresponding to FIG. 4A, wherein two VCs each request the transmission of one SDU having the same number of PDUs at about the same time, with each VC having a PCR equal to 100% of the available bandwidth. As shown in FIG. 4B, each VC is given a maximal amount of bandwidth, i.e., up to its PCR, but the average latency is reduced compared to FIG. 4A.

Figure 6A:
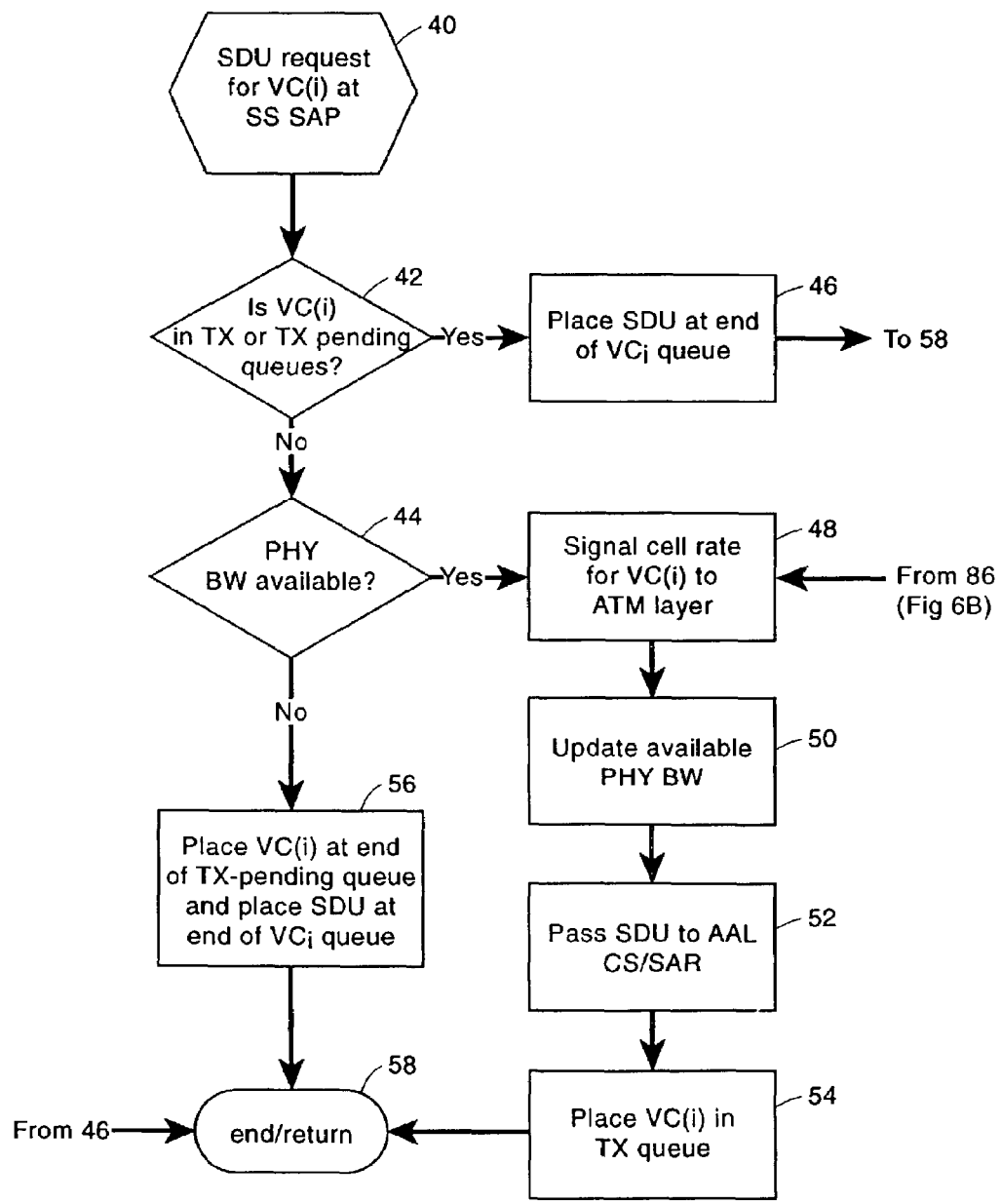
FIGS. 6A and 6B are flowcharts illustrating a first preferred method, carried out by the scheduling sublayer, for servicing SDU data requests.
Figure 6B:
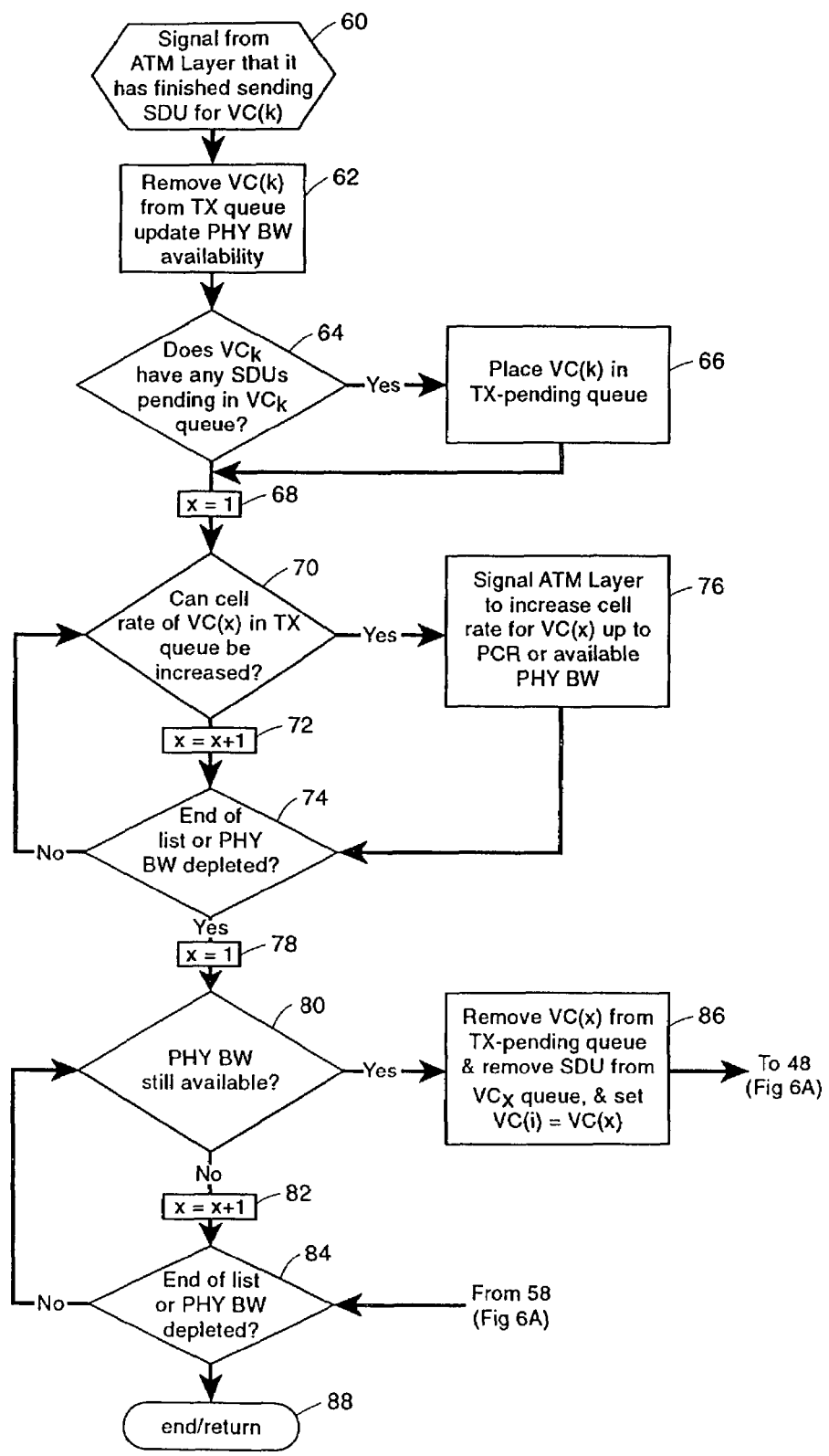
Figure 7:
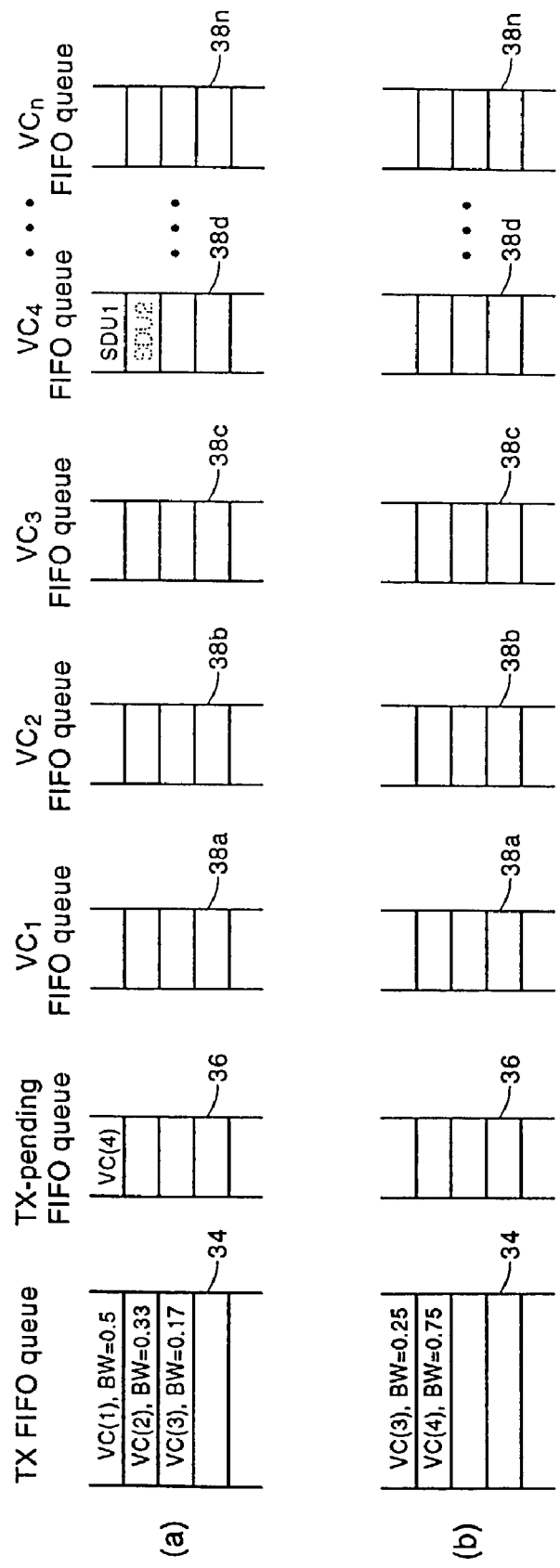
FIG. 7 is a diagram illustrating various queues employed by the scheduling sublayer according to the first preferred embodiment.

FIGS. 6A and 6B illustrate in flow chart form the preferred scheduling method carried out by the scheduling sublayer 24. FIG. 7 illustrates various queues employed by the scheduling sublayer 24. A TX list or queue 34 stores a list of VCs which are currently being transmitted by the CS/SAR and ATM Layer; that is, those VCs which have had an SDU (i.e., all of the PDUs thereof) passed to SAR 12 by the scheduling sublayer 24. Queue 34 also stores the current cell rate for each VC listed therein. A TX-pending queue 36 stores a list of all VCs which have made data requests to the scheduling sublayer 24, but the data requests and SDUs thereof have not yet been passed by the scheduling sublayer to AAL SAR SAP 15. In addition, for each VC listed in queue 36, there exists one VC buffer or queue 38A, 38B, 38C, 38D, . . . or 38N for storing unprocessed SDUs of the corresponding VC.

There are two triggering events in the preferred method. Event 40 (FIG. 6A) is the occurrence of a data request from the AAL user at any SS SAP 26. Event 60 (FIG. 6B) is the communication of signal 30 by ATM Layer equipment 11' to the scheduling sublayer 24 indicating that the equipment has finished transmitting an SDU (i.e., the last PDU thereof has been transmitted) for a given VC.

Referring to FIGS. 5, 6A and 7, when the scheduling sublayer 24 receives at any SS SAP 26 a data request and the SDU thereof for a given VC, VC(i), the scheduling sublayer 24 checks at step 42 whether or not VC(i) is currently being serviced by it, i.e., if VC(i) is in the TX queue 34 or TX-pending queue 36. If so, at step 46, the scheduling sublayer 24 stores the SDU in a corresponding $VC_i$ queue 38. These steps ensure that the AAL SDUs of a given VC are transferred to the CS/SAR in sequential order.

If the condition at step 42 is not satisfied, then a check is made at step 44 whether or not there is any unused PHY bandwidth for the service class that VC(i) belongs to. If PHY bandwidth is available, then at steps 48, 50, 52 and 54 the scheduling sublayer 24:

(a) instructs the ATM Layer to set the current cell rate for VC(i) to the lower of: (i) the PCR of VC(i), and (ii) the remaining unused PHY bandwidth for the service class that VC(i) belongs to;
(b) decreases the available PHY bandwidth for the service class that VC(i) belongs to by its current cell rate;
(c) passes the SDU to the CS/SAR which, practically speaking, very quickly completes the segmentation of the SDU into PDUs and passes these to the ATM Layer for transmission; and
(d) adds VC(i) to the tail end of the TX queue 34.

If, however, no PHY bandwidth is available at step 44, at step 56 VC(i) is added to the tail end of the TX-pending queue 36 and the SDU of VC(i) is added to the tail end of the corresponding $VC_i$ queue 38.

Referring to FIGS. 5, 6B and 7, when the scheduling sublayer 24 receives an indication at event 60 that the ATM Layer 11 has finished sending all PDUs corresponding to an SDU of a given VC, VC(k), through the PRY SAP 14, the SS 24 proceeds at step 62 to remove VC(k) from the TX queue 34 and update the PHY bandwidth availability for the service class that VC(k) belongs to. At step 64, a check is made whether or not VC(k) has any AAL SDUs pending transmission, that is, if any SDUs are present in $VC_K$ queue 38. If so, at step 66 VC(k) is placed on the TX-pending queue 36.

Steps 68, 72 and 74 set up a loop for scanning the TX queue 34, starting from its head. Step 70 determines whether the current cell rate of any VC, VC(x), in queue 34 can be increased. If so, at step 76 the scheduling sublayer 24 signals ATM Layer 11 to increase the current cell rate for VC(x) to the lower of: (i) the PCR of VC(x), and (ii) the remaining unused PHY bandwidth for the ATM service class that VC(x) belongs to. The available PHY bandwidth for that service class is also decreased accordingly. The TX queue 34 is scanned until the end of the queue or until the total PHY bandwidth available at PHY SAP 14 is exhausted.

Steps 78, 82 and 84 set up a loop for sequentially scanning the TX-pending queue 36, starting from its head. If at step 80 PHY bandwidth remains available in the service class of a given VC, VC(x), at the head of queue 36, then at step 86 the scheduling sublayer 24 removes VC(x) from TX-pending queue 36. The scheduling sublayer 24 also removes the AAL SDU at the head of the corresponding $VC_x$ queue 38, and processes the removed SDU as if a data request for VC(x) was received at the SS SAP 26, as per steps 48 through 58 discussed above. The TX-pending queue 36 is scanned until the end of the queue or until the total PHY bandwidth available at PHY SAP 14 is exhausted.

Figure 1:
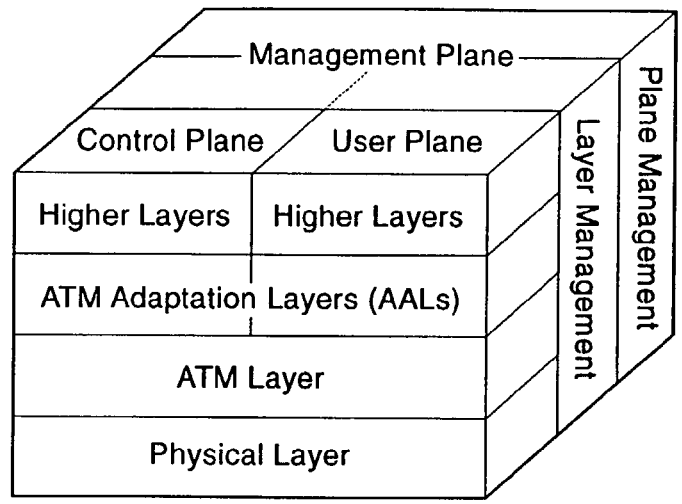
FIG. 1 is an illustration of an ATM protocol stack.
Figure 2:
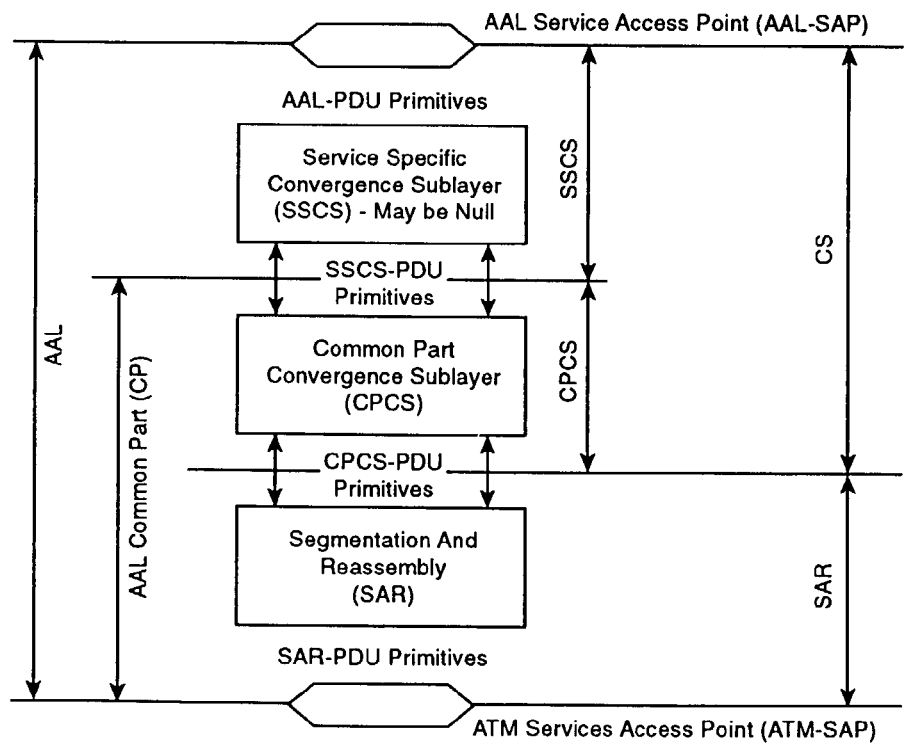
FIG. 2 is a protocol diagram illustrating the sub-layers of an ATM Adaption Layer (AAL) shown in FIG. 1.
Figure 3:
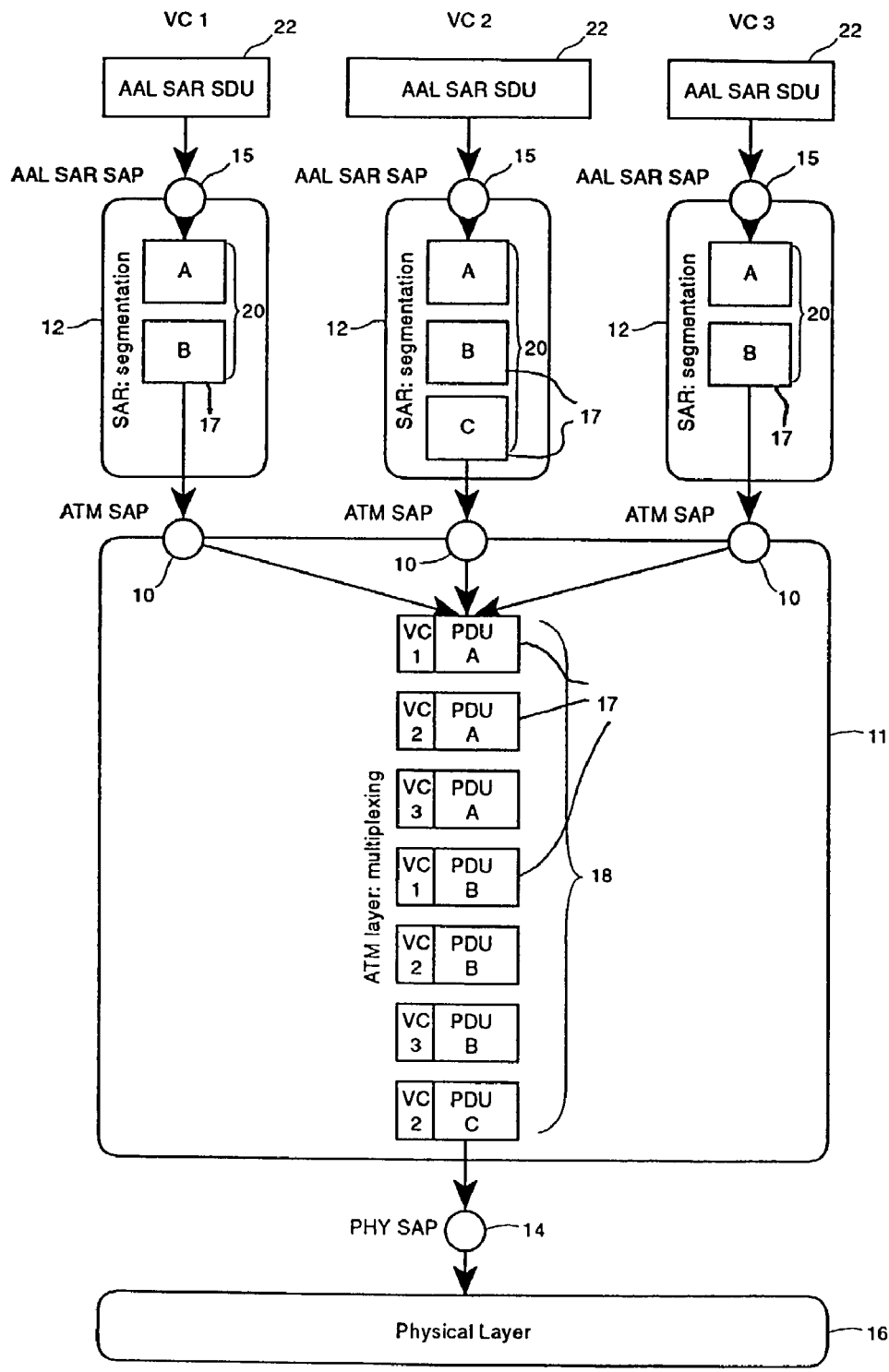
FIG. 3 is a data flow diagram illustrating the flow of PDUs through an ATM Layer shown in FIG. 1 using a round-robin scheduling discipline for servicing parallel instances or invocations of the AAL.

Referring to FIGS. 8, 9 and 10, an example of how the scheduling sublayer 24 provides a lower average latency in transmitting SDUs than the prior art system shown in FIG. 3. FIG. 8 is a table which specifies the VC identifier related to each data request, the time at which the request is made, the number of PDUs in the SDU, and the PCR for the VC. For simplicity, the VCs are assumed to belong to the same service class and the PCR is given as a percentage of the PHY bandwidth. The time has also been unitized so that one time unit is the length of time required for the PHY to send a single cell.

FIG. 9 is a bandwidth occupancy chart illustrating the latency of each SDU that would likely result from the preferred scheduling method. This latency is the difference between the time a data request for the SDU was first made at SS SAP 26 and the time at which the last PDU for the SDU was sent by the ATM Layer to the PHY. For comparison, FIG. 10 illustrates the latencies which would result under a typical prior art round-robin ATM Layer multiplexing scheme. The average latencies per unit of SDU data,—that is, per PDU—are calculated and tabulated in the FIG. 8 table. The average latencies are calculated by taking the sums of the latency of each SDU multiplied by the number of PDUs in the SDU, and dividing by the total number of PDUs in all SDUs.

Under the prior art system as shown in FIG. 10, all VCs begin transmission simultaneously, with each VC occupying 25% of the PHY bandwidth. At t=8, the SDU requested by VC 2 will have completed transmission. Accordingly, the prior art system equally reallocates the PHY bandwidth formerly occupied by VC 2 to VC 1 and VC 4; VC 3 is already transmitting at its PCR and cannot be allocated more bandwidth. The SDUs requested by VC 1 and VC 4 complete transmission at approximately time t=10.5, (in practice, one at time t=10 and one at time t=11). At t=16, the SDU requested by VC 3 completes transmission. The average latency is computed as $(10.5*3+8*2+16*4+10.5*3)/(3+2+4+3) \approx 11.9$.

Under the preferred method, as shown in FIG. 9, at t=0, VC 1 is allocated its PCR, and the ATM Layer is instructed to send the PDUs of VC 1 at 50%, of the PHY bandwidth. The SDU for VC 1 is passed to the SAR. Similarly, VC 2 is allocated its PCR, and the ATM Layer is instructed to send the PDUs of VC 2 at 33% of the PHY bandwidth, and the SDU for VC 2 is passed to the SAR. VC 3 is allocated the remaining PHY bandwidth, and the SDU for VC 3 is passed to the SAR. VC 1, VC 2 and VC 3 are added to the TX queue 34 of VCs whose SDU transmission is in progress. Finally, since there is no remaining PHY bandwidth for VC 4, the scheduling sublayer adds VC 4 to the TX-pending queue 36 of VCs which have data requests pending. This state is also illustrated in FIG. 7A.

At t=6, VC 1 and VC 2 both complete transmission of all PDUs for their SDUs. The scheduling sublayer 24 removes these VCs from the TX queue 34 of VCs whose transmission is in progress, and the PHY is marked as having 83% of its bandwidth previously allocated to those VCs as free. The TX-pending queue 36 of VCs whose transmission is in progress is then scanned, and VC 3 is found to be operating below its PCR, so the ATM Layer is instructed to increase the PHY bandwidth allocated to VC 3 from 17% to 25%. Since there is still free PHY bandwidth, the TX-pending queue 36 of VCs with data requests pending is scanned. VC 4 is found, and the ATM Layer is instructed to allocate 75% of the PHY bandwidth to VC 4—75% being both VC 4's PCR and the previously remaining free PHY bandwidth—and the SDU for VC 4 is passed to the SAR. VC 4 is then added to the TX queue 34 of VCs whose transmission is in progress. This state is also illustrated in FIG. 7B.

At t=10, VC 4 completes transmission of PDUs for its SDU. VC 4 is therefore removed from the TX queue 34 of VCs whose transmission is in progress. Queue 34 is then scanned. VC 3 is found, but it is already transmitting at its PCR, so its transmission is not modified. There are no other VCs with data requests pending, so the PHY becomes 75% idle. At t=18, VC 3 completes transmission.

The average latency under the scheduling sublayer 24 is computed as (6*3+6*2+18*4+10*3)/(3+2+4+3)=11.

The preferred embodiment provides a number of advantages. First, it schedules SDUs to minimize the average amount of latency per unit of AAL SDU data on a given PHY. This results in effectively a lower average delay in data transmission through an ATM network. Second, the preferred method features a low storage and computational load, and can therefore be easily applied in real time systems. Third, the preferred embodiment strives to ensure that all available PHY bandwidth is consumed. Fourth, the preferred embodiment is not dependent on elaborate ATM Layer equipment. The only requirement of the ATM Layer equipment is that it be configurable so that the transmission rate of each connection or VC can be dynamically adjusted.

However, while the preferred embodiment employs ATM Layer equipment capable of generating a direct indication, e.g. software interrupt, of when an AAL SDU has finished being transmitted through the ATM Layer, alternative embodiments need not provide this capability. Instead, the scheduling sublayer may use a separate timer to provide this indication. This is because the scheduling sublayer 24 is provided with the cell rate of each VC and the number of AAL PDUs to be sent on each connection. Therefore, the scheduling sublayer can compute the approximate time (i.e., ignoring cell delay variation introduced by ATM Layer multiplexing and PHY functions) at which the ATM Layer will finish sending the ATM PDUs to the PHY SAP.

It should also be realized from the foregoing that the scheduling sublayer 24 implements a first-come, first-served scheduling discipline with respect to data requests at the point of contention. For example, referring to FIGS. 8 and 9, VCs 1, 2, 3 and 4 submit SDU data requests in that order, so the scheduling sublayer 24 services the connections in that order. In the particular example shown, the SDU of VC 4 cannot be immediately transferred to the CS/SAR because no bandwidth is available due to the servicing of the other VCs and so the SDU of VC 4 is forwarded to the CS/SAR at time t=6. Nevertheless, through the use of queues 34, 36 and 38, the scheduling sublayer 24 applies a round-robin service discipline with respect to the connections per se. For instance, referring to FIGS. 8 and 9, suppose that at time t=0⁺, VC 1 presents a second SDU (i.e., two SDUs) to the scheduling sublayer 24 before VC 4 presents its SDU thereto. Due to step 42 of the preferred method, the scheduling sublayer 24 places the second SDU of VC 1 in $VC_1$ queue 38A. The SDU of VC 4 is placed in $VC_4$ queue 38D, but VC 4 is itself placed in the TX-pending queue 36. At time t=6 when the first SDU of VC 1 has finished transmitting, step 64 of the preferred method notes that VC 1 has an outstanding data request and thus places VC 1 on the TX-pending queue 36, behind VC 4. Thus, at time t=6 when bandwidth becomes available, the (only) SDU of VC 4 is submitted to the CS/SAR by step 86 ahead of the second SDU of VC 1, even though the latter physically arrived at the scheduling sublayer 24 prior to the former. In this manner, the preferred method provides a means for ensuring that no VC is starved.

In alternative embodiments, the scheduling sublayer could implement a strict first-come first-served order per SDU, e.g., by transferring each SDU to the CS/SAR in the order of arrival as follows: (i) immediately, provided that bandwidth is available, or in due course, when bandwidth becomes available to the VC of that SDU or (ii) immediately, if the VC of that SDU is currently transmitting an SDU, thereby essentially changing the queuing point for such VCs to the ATM Layer. Such an embodiment may, however, risk starving a connection.

The AAL according to preferred embodiment as shown in FIG. 5 places the scheduling sublayer 24 above the CS/SAR layers 12 and 13. It should be appreciated that in alternative embodiments the scheduling sublayer 24 may be placed between the SAR layer 12 and the ATM layer 11. In such an embodiment, the scheduling sublayer transfers groups of AAL SAR PDUs to the ATM layer 11, wherein each group of AAL SAR PDUs corresponds to an AAL SDU. This embodiment yields an AAL having the same functionality as that of the preferred embodiment because the payload of the group of AAL SAR PDUs is in effect the AAL SDU.

Service Classes Characterized by PCR and SCR

The embodiment described above operates well when the ATM virtual connections have traffic parameters such that they are always permitted to transmit at rates up to some peak cell rate. However, further optimization of the scheduling sublayer 24 can be obtained for the non-real-time variable bit rate (nrt-VBR) service category, where the rate at which a VC can transmit at a particular instant may vary between a specified sustainable cell rate and a peak cell rate.

Figure 11:
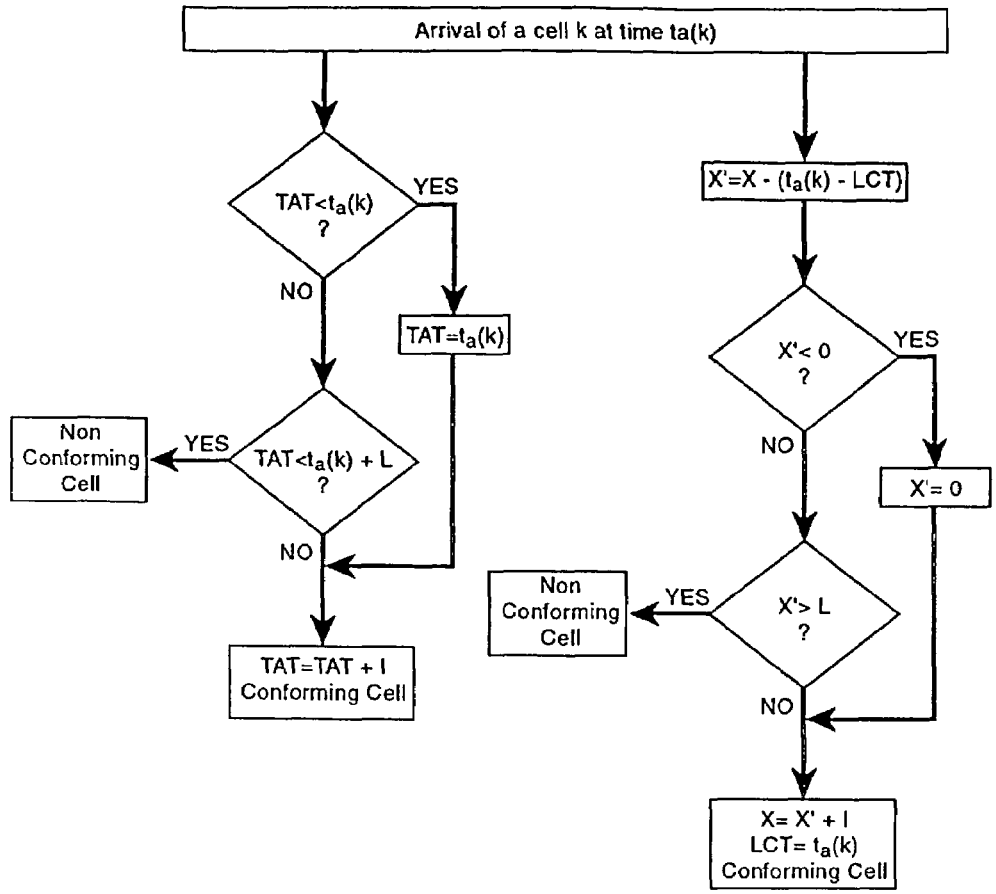
FIG. 11 is a flow chart of a leaky bucket algorithm.

ATM Forum document no. AF-TM-0056.000 and ITU specification no. I.371 describe the VBR traffic contract in terms of peak cell rate (PCR), sustainable cell rate (SCR) and maximum burst size (MBS). Compliance to the VBR traffic contract is defined in terms of the generic cell rate algorithm (GCRA), also commonly known as the "leaky bucket" algorithm, which is shown in FIG. 11. A VC is said to be compliant if the cell stream carried by that VC conforms to both GCRA ($T_S$, $\tau_S$) and GCRA ($T_P$, 0), where $T_S$ is the cell period at the SCR, $$\left(T_S = \frac{1}{SCR}\right),$$

$T_p$ is the cell period at the PCR, $$\left(T_p = \frac{1}{PCR}\right),$$

and $\tau_S$ is the burst tolerance, $(\tau_S=(MBS-1)*(T_S-T_p))$.

The essence of the non-real-time VBR traffic contract is that it explicitly allows a VC to transmit in a "bursty" fashion. That is, a nrt-VBR VC can transmit indefinitely at its SCR, and be in conformance with its traffic contract. Alternatively, the VC can cyclically transmit at rates above its SCR, up to its PCR, for a well-defined period, followed by another period during which it must transmit at rates below its SCR. This bursty transmission pattern is also in conformance with the nrt-VBR traffic contract.

Figure 12:
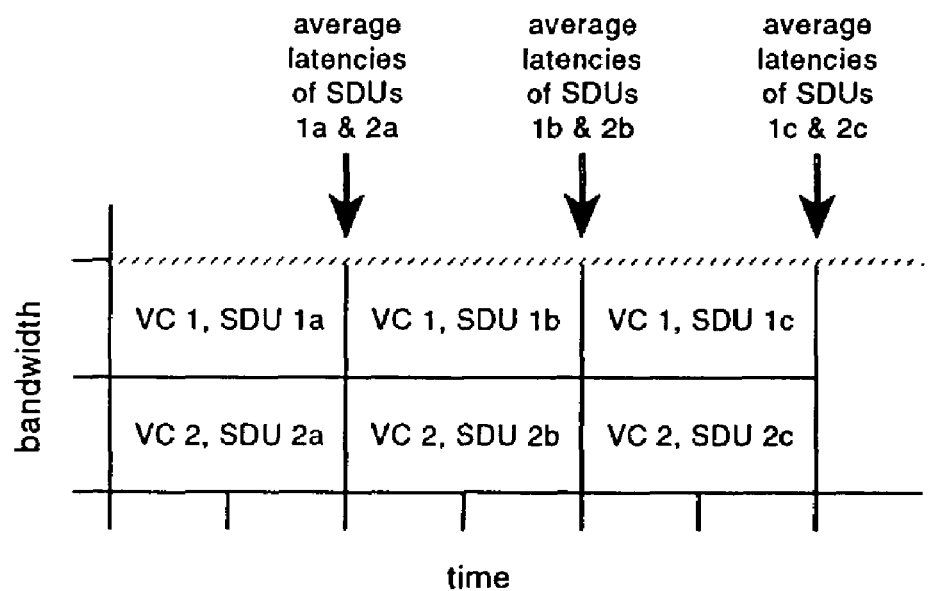
FIG. 12 is a bandwidth occupancy chart exemplifying a transmission pattern for non-real-time VBR VCs in accordance with the first preferred method.

FIG. 12 is a bandwidth occupancy chart illustrating a transmission pattern that arises under the scheduling sublayer 24 of the first preferred embodiment for two nrt-VBR VCs. Each of these VCs has a set of AAL SDUs to send, with traffic parameters specifying an SCR of 50% of the PHY bandwidth and a PCR of 100% of the PHY bandwidth. It will be seen that each VC is continually sending at its SCR, and there is no burstiness in transmission. This transmission pattern is in conformance with the example nrt-VBR traffic contract, and the average latencies are noted on the chart.

Figure 13:
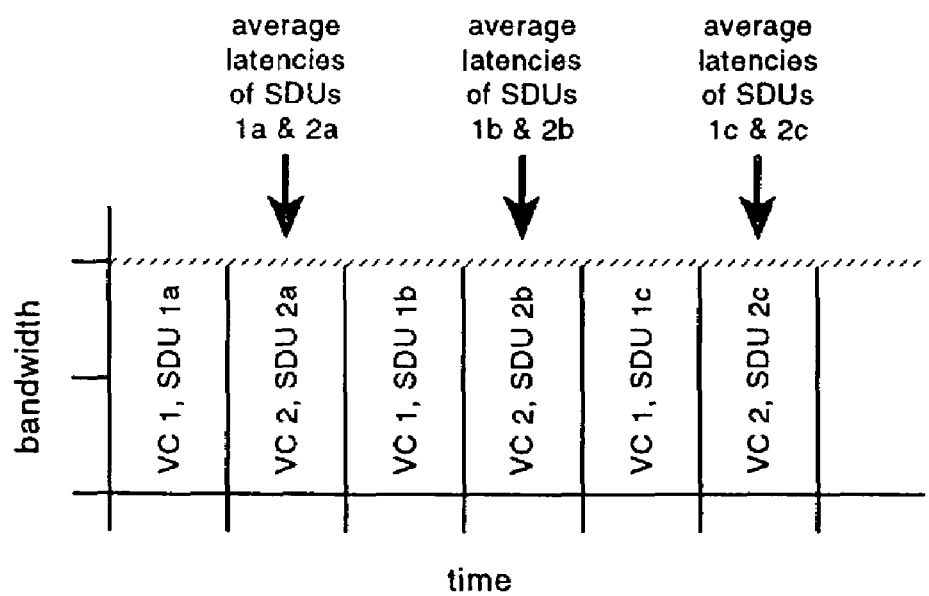
FIG. 13 is a bandwidth occupancy chart exemplifying a transmission pattern for the same non-real-time VBR VCs shown in FIG. 12 but in accordance with a second preferred method for scheduling SDUs.

The second preferred embodiment improves upon the first preferred embodiment by modifying the scheduling sublayer 24 to schedule the transmission of an SDU such that the burstiness permitted by the nrt-VBR traffic contract is advantageously used to further reduce the average latency in the transmission of an SDU. This is done by scheduling the transmission of SDUs from various VCs such that the VCs may alternate between transmitting at rates approaching their PCRs and pausing their transmission, and by having the bursts in the transmission of each VC contain exactly one SDU. The transmission pattern under this approach is shown in FIG. 13 for the same example traffic contract described with reference to FIG. 12. It will be seen that while one VC has paused its transmission, the other VC is sending at its PCR. This transmission pattern is highly bursty, but also conforms to the example nrt-VBR traffic contract.

As in the first embodiment, the second embodiment employs ATM Layer equipment 11' which preferably has the following characteristics:

Each VC whose cells are multiplexed by the ATM Layer may be assigned its own constant cell period. This cell period may be modified at any time by some other entity in the system, such as the scheduling sublayer 24, but it is not otherwise modified by the ATM layer.

The ATM Layer performs cell multiplexing such that, for each opportunity it has to send a cell to the PHY, it may select a cell from any of the VCs for which it has candidate cells available for transmission, provided only that the interval between the current instant and the time at which the previous cell was transmitted for a particular VC is not less than the cell period specified for that VC.

In the event that the cell period specified for a VC is modified by some entity such as the scheduling sublayer, the interval between the time at which the last cell was transmitted at the old cell period and the first cell is transmitted at the new cell period is not less than the lesser of the old and new cell periods.

Figure 14A:
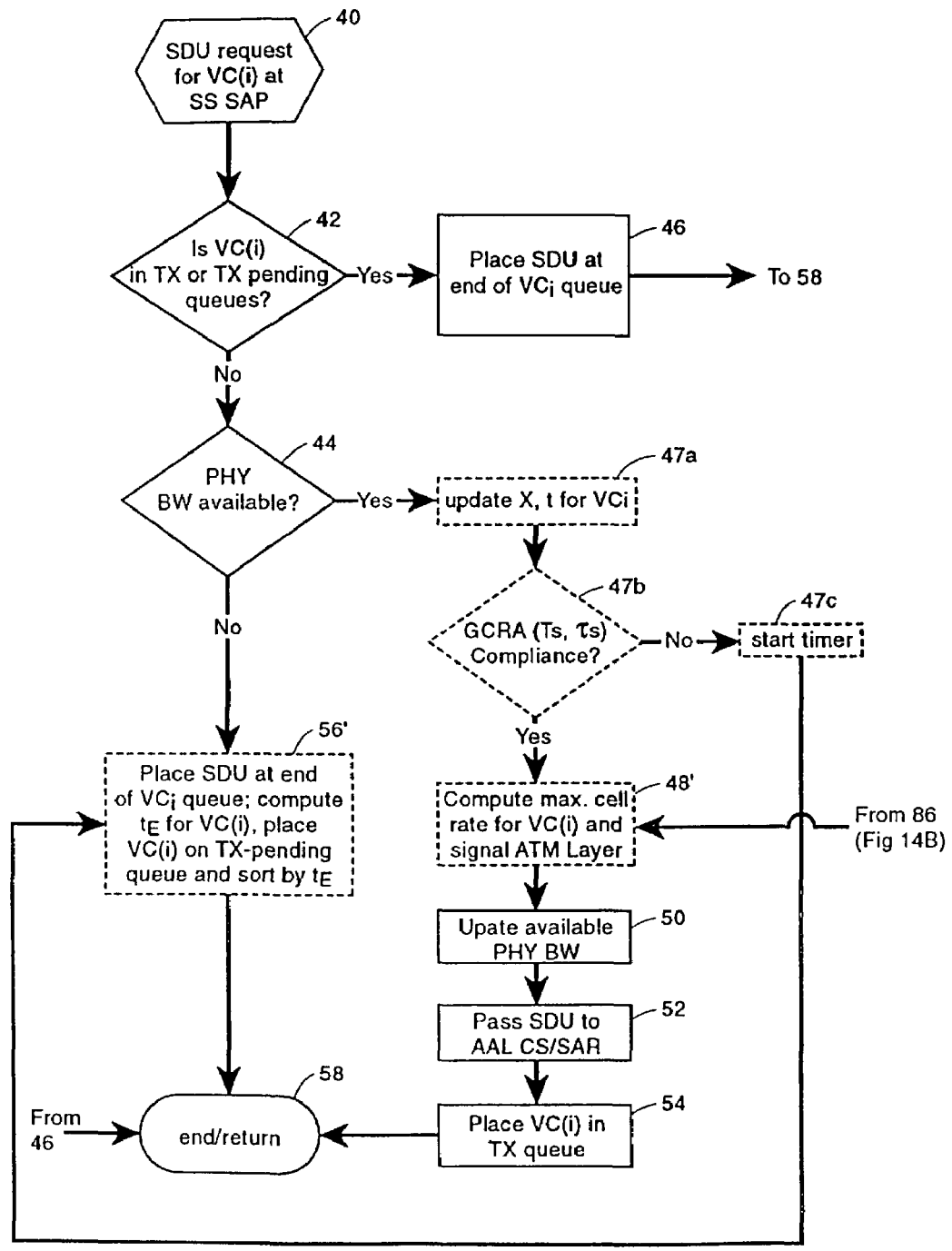
FIGS. 14A and 14B are flowcharts illustrating the second preferred method, carried out by the scheduling sublayer, for servicing SDU data requests.
Figure 14B:
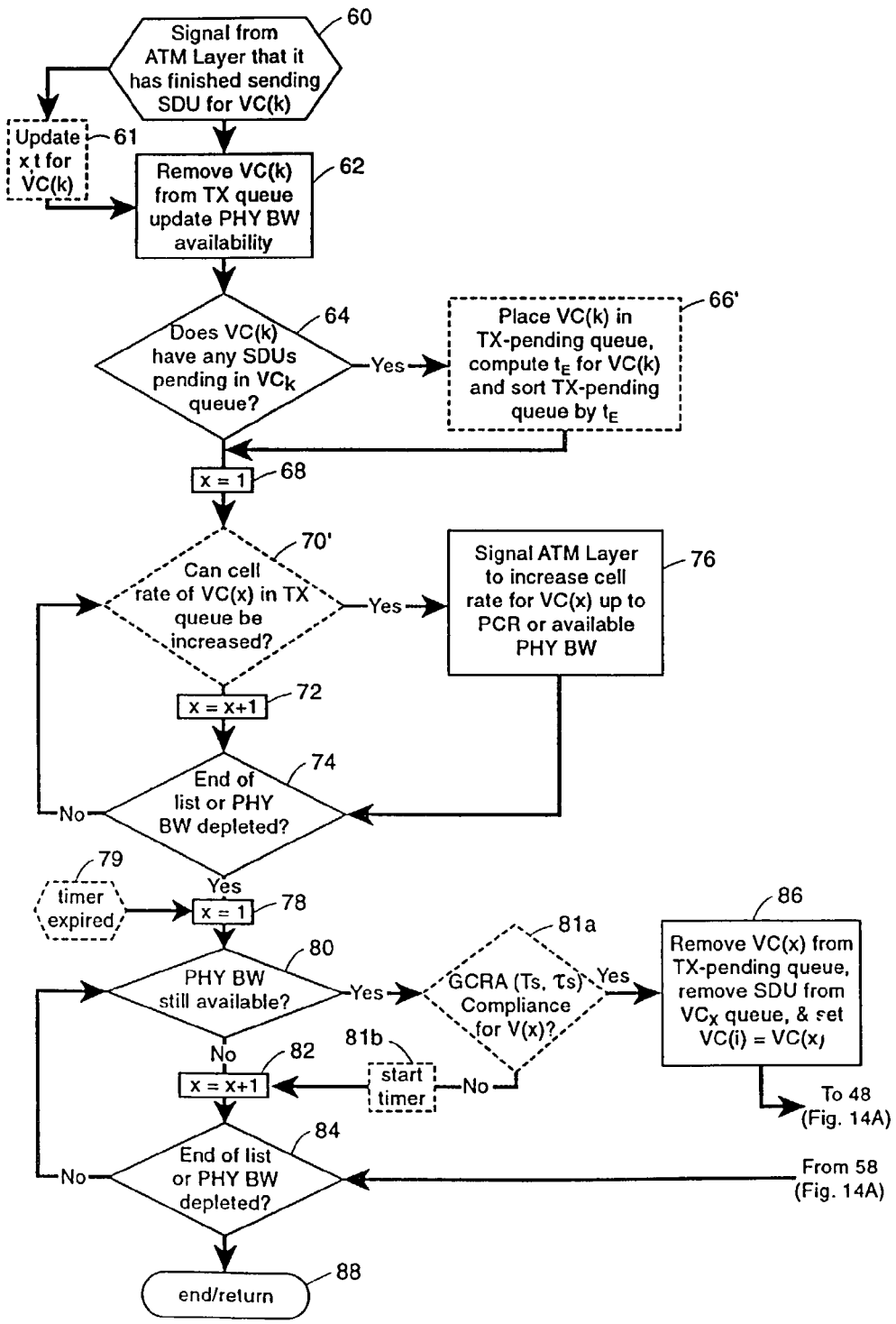

FIGS. 14A and 14B show the preferred method carried out by the scheduling sublayer 24 in accordance with the second preferred embodiment. Those steps which have been added or modified in relation to FIGS. 6A and 6B of the first embodiment are shown in stippled outlines.

In the second preferred method, the scheduling sublayer 24 stores two parameters, t and X, for each VC. X corresponds to the "fill level" of the GCRA($T_S$, $\tau_S$) "leaky bucket", measured at time t. Initially, i.e., when a given VC is established, both X and t are zero. X and t are preferably recomputed by the scheduling sublayer 24 for each VC at two instants: (i) at a step 47a (FIG. 14A), before the scheduling sublayer 24 passes (at step 52) a given SDU 22 to the CS/SAR 12, and (ii) at a step 61 (FIG. 14B), after the scheduling sublayer 24 receives (at event 60) an indication that the transmission of the given SDU 22 is complete.

At step 47a, before the scheduling sublayer 24 requests the SAR 12 to transmit a given SDU, X and t are calculated as follows:

$$X \leftarrow \max(X-t_{now}+t, 0)$$

$$t \leftarrow t_{now} \quad \{1\}$$

where $t_{now}$ represents the time at which the calculation is performed. This calculation represents the "draining" of the leaky bucket in the period from t to $t_{now}$, during which there was no transmission of PDUs for the VC.

At step 61, after the scheduling sublayer 24 receives an indication that the transmission of the given SDU is complete, X and t are calculated as follows:

$$X \leftarrow \max(X-t_{now}+t+N*T_S, 0)$$

$$t \leftarrow t_{now} \quad \{2\}$$

where N is the number of PDUs (that is, the number of ATM cells) into which the given SDU was segmented by the SAR 12. This calculation represents the "filling" of the leaky bucket in the period from t to $t_{now}$, during which N PDUs were transmitted on the VC.

When the scheduling sublayer 24 has a candidate SDU which could begin transmission immediately, it checks whether the first cell of that SDU would be conformant with GCRA($T_S$, $\tau_s$) if the SDU were transmitted immediately, i.e., if $X-t_{now}+t \leq \tau_S$. Such a check occurs at step 47b (FIG. 14A), which corresponds to the condition where an AAL user sends a data request to the scheduling sublayer 24, PHY bandwidth is currently available, and queues 34 and 36 of pending SDUs for that VC are empty. This check also preferably occurs at step 81a (FIG. 14B) which corresponds to the situation where another SDU has completed transmission and the scheduling sublayer is scanning the TX-pending queue 36 of VCs with pending SDUs.

If the check, $X-t+t \leq \tau_S$ is satisfied, the scheduling sublayer 24 can pass the candidate SDU to the CS/SAR 12 for immediate transmission. If the check is not satisfied, the scheduling sublayer 24 cannot immediately begin transmitting the candidate SDU without violating GCRA($T_S$, $\tau_s$). Instead, in the case of a newly submitted SDU, at step 56' the SDU is placed at the end of the queue 38 of pending SDUs for that VC, and that VC is placed on the TX-pending queue 36 of VCs which have pending SDUs. In the case where the scheduling sublayer 24 is scanning the TX-pending queue 36 of VCs with pending SDUs, queue 36 is left untouched. In either case, at steps 47c (FIG. 14A) and 81b (FIG. 14B), the scheduling sublayer 24 starts a timer set to a period $X-\tau_S-t_{now}+t$. When this timer expires at event 79 (FIG. 14B), the scheduling sublayer will again scan the TX-pending queue 36 of VCs with pending data requests. At that time, the former candidate SDU should be able to be transmitted in conformance with GCRA($T_S$, $\tau_S$).

Before the scheduling sublayer passes an SDU to the CS/SAR for transmission (step 52), at step 48' the scheduling sublayer computes a cell period, T, (T being the inverse of the cell rate) which should be applied by the ATM Layer to the VC over the course of the transmission of the SDU.

When N>1, T is calculated according to:

$$T \leftarrow \max\left(T_S + \frac{X - \tau_S}{N - 1}, T_p, T_L\right) \text{ if } N > 1 \quad \{3a\}$$

where $T_L$ represents the period at which the remaining bandwidth of the PHY would be completely consumed by the transmission of this SDU. The first term of the above max( ) function represents the cell period which would cause the "bucket" of the VC to be completely filled at the end of the SDU's transmission. This implies that the SDU will be transmitted in as fast a burst as possible while still being in conformance with GCRA($T_S$, $\tau_S$). (Note that $X=\tau_S$ implies that the bucket is full when the SDU's transmission begins, in which case the first term of the max( ) function simplifies to $T_S$—when the bucket is full, the cell period cannot be less than the sustainable cell period.) The second term prevents the cell period from being less than the peak cell period. The third term prevents the VC from attempting to consume more PHY bandwidth than exists.

When N=1, the first term in equation {3a} is not considered. Thus, $$T \leftarrow \max(T_p, T_L) \quad \{3b\}$$

After an SDU's transmission is completed (event 60), the scheduling sublayer 24 attempts at step 70' to increase the cell rate, i.e., decrease the cell period, of any VCs with SDUs currently in transmission. To accommodate this, the scheduling sublayer 24 stores parameters $X_{est}$, $R_{est}$ and $t_{est}$ for each VC. These represent the estimated bucket fill level, the estimated number of cells remaining to transmit in the SDU, and the time of estimation, respectively. They are initialized at step 52, when the scheduling sublayer 24 passes an SDU to the CS/SAR for transmission, according to:

$$X_{est} \leftarrow X, R_{est} \leftarrow N, t_{est} \leftarrow t \quad \{4\}$$

Thereafter, if the VC's cell period is adjusted while the SDU is in transmission, the new cell period is computed at step 70' according to:

$$X_{est} \leftarrow X_{est} + (t_{now} - t_{est})T_S - \frac{T}{T} \quad \{5a\}$$

$$R_{est} \leftarrow R_{est} - \frac{t_{now} - t_{est}}{T} \quad \{5b\}$$

$$t_{est} \leftarrow t_{now} \quad \{5c\}$$

$$T \leftarrow \max\left(T_S + \frac{X_{est} - \tau_S}{R_{est} - 1}, T_p, T_L\right) \text{ if } R_{est} > 1 \quad \{5d\}$$

If $R_{est} \leq 1$, the cell period of the VC is not modified.

Again, the first term in the max( ) of equation {5d} results in a cell period T such that the bucket will be full when the SDU's transmission is complete.

The "est" subscript in the above expressions refer to the fact that $X_{est}$ and $R_{est}$ are estimates of the bucket fill level and number of cells remaining to be transmitted in the SDU, based on the elapsed time since the last estimate (or since the SDU's transmission was requested to the SAR) and the cell period; they are not based on direct indications from the ATM layer or the SAR.

In the event that the ATM Layer can provide a direct indication of the number of cells remaining to be transmitted, then the scheduling sublayer need not track $X_{est}$ separately from X Alternatively, in the event that the ATM Layer does not provide direct indications at any time, including when the last cell of an AAL SDU has been transmitted, there is again no need to distinguish between $X_{est}$ and X. $X_{est}$ should be distinguished from X only if the calculations during the transmission of an SDU are time based estimates and the calculations at the end of the transmission of an SDU are based on a direct indication from the ATM Layer. The advantage of this distinction is that any errors which may accumulate in the estimations are discarded when the direct indication is received at the ATM Layer.

The foregoing additions and modifications to the first preferred embodiment have the objective of determining the maximum possible cell rate which can be used for a particular VC at a particular instant in time while maintaining conformance to the VBR traffic contract.

In addition to the foregoing additions and modifications, at steps 56' (FIG. 14A) and 66' (FIG. 14B) the scheduling sublayer 24 sorts the TX-pending queue 36 of VCs which have SDUs pending transmission according to increasing values of parameter $t_E$:

$$t_E \leftarrow X + t \quad \{6\}$$

$t_E$ is simply the time at which the VC's bucket will be empty. This means that when one SDU's transmission has completed and another SDU's transmission may begin, the SDU selected to begin transmission will be the one on the VC whose bucket is emptiest. The VC with the emptiest bucket is that which can transmit at a cell rate closest to its PCR, and is therefore the VC which can achieve the most bursty transmission.

Figure 15:
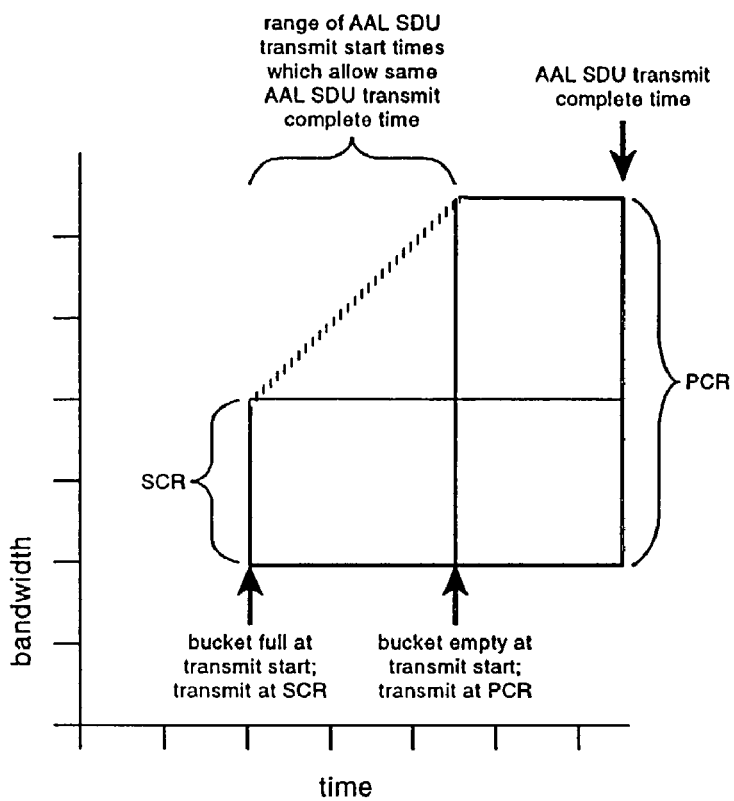
FIG. 15 is a bandwidth occupancy chart illustrating a range of possible transmission times for PDUs of an SDU associated with a non-real-time VBR VC.

Steps 56' and 66' attempt to maximize burstiness by taking advantage of the linearity of the GCRA. As shown in FIG. 15, there is a range of times when transmission of an SDU can begin which result in the same time for the completion of transmission of the last cell for that SDU, and hence the same latency therefor. Within that range, if the start of transmission of an AAL SDU is delayed such that the VC is not transmitting during that delay period, the VC's bucket will be emptying. This allows the SDU to eventually be transmitted at a cell rate approaching the PCR, which recoups the delay time. Thus, the increase in burstiness has no impact on that latency of the SDU. However, in the idle time before that transmission of that SDU begins, it is possible that another SDU could be completely transmitted on another VC, thereby lowering the average SDU latency of the system.

An example is now presented of the advantages obtained by sorting the TX-pending queue 36 in steps 56' and 66' in order to maximize burstiness and hence reduce latency. Consider a system having three nrt-VBR Vcs with each VC having the same traffic parameters: a PCR of 100% of the PHY bandwidth, an SCR of 50% of the PHY bandwidth, and an MBS of 4. This yields $T_p=1$, $T_S=2$ and $t_S=3$ for each VC. (As before, a unit of time is deemed to be the time required to transmit one SAR PDU or cell at the PHY.)

Suppose at time 0, the scheduling sublayer 24 receives a data request on VC 1 for an SDU which will be segmented into 4 SAR PDUs, and immediately thereafter receives a data request on VC 2 for an SDU which will fit into a single SAR PDU. Just after time 4, the scheduling sublayer receives another data request on VC 1 for an SDU which will be segmented into 3 SAR PDUs. Also just after time 4, the scheduling sublayer receives a data request on VC 3 for an SDU which will be segmented into 3 SAR PDUs. Assume that all VCs are in their initial state, with empty buckets, at time 0.

Figure 16:
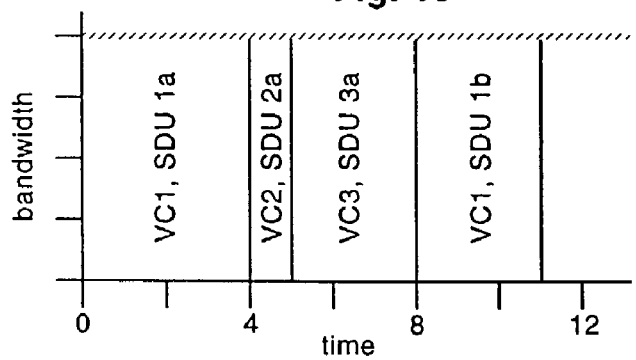
FIG. 16 is a bandwidth occupancy chart exemplifying a transmission pattern for non-real-time VBR VCs in accordance with the second preferred method.

Referring additionally to the bandwidth occupancy chart of FIG. 16, the scheduling sublayer proceeds as follows:

$t_{now}$=0: First, the scheduling sublayer verifies that VC 1 is GCRA($T_S$, $\tau_S$) compliant, i.e., that X-$t_{now}$+t≦$\tau_S$ for VC 1. Since this condition is met, VC 1 can begin transmission of an AAL SDU immediately. The scheduling sublayer then computes (X, t)=(0, 0) for VC 1. The period at which PDUs should be transmitted for this SDU is, from equation {3a}, given by:

$$T = \max\left(T_S + \frac{X - \tau_S}{N - 1}, T_P, T_L\right) = \max\left(2 + \frac{0 - 3}{4 - 1}, 1, 1\right) = 1$$

In other words, the scheduling sublayer will tell the ATM Layer to set the cell rate of VC 1 to 100% of the PHY bandwidth, and will request the transmission of the SDU for VC 1 to the SAR.

Also, since all the PHY bandwidth has been allocated at this time, the SDU requested for VC 2 is added to the end of the $VC_2$ queue 38b of pending SDUs for VC 2, and VC 2 is placed on the TX-pending queue 36 for VCs having pending data requests, with $t_E$=0.

$t_{now}$=4: The transmission of the SDU for VC 1 is completed. The parameters (X, t)=(0−4+0+2*4, 4)=(4, 4) are stored against VC 1. The transmission latency for this SDU is 4. There are no other VCs with SDUs in transmission. The TX-pending queue 36 of VCs having pending data requests is scanned, finding VC 2. For VC 2, the condition X-$t_{now}$+t≦$\tau_S$ is met, so transmission may begin. The parameters (X, t)=(0, 4) are computed for VC 2. Since N=1 for the SDU requested on VC 2, the transmission of the SDU occurs at the peak cell period of 1. The scheduling sublayer 24 thus signals the ATM Layer 11 to set the cell rate of VC 2 to 100% of the PHY bandwidth, and will request the transmission of the SDU for VC 2 to the SAR 12.

$t_{now}$=4+: Next, the scheduling sublayer receives the data request for the second SDU on VC 1. Since there is no unused PHY bandwidth remaining, the SDU requested for VC 1 is added to the end of $VC_1$ queue 38a of pending SDUs for VC 1, and VC 1 is placed on the TX-pending queue 36 for VCs with pending SDU data requests, with $t_E$=X+t=8.

Finally, the scheduling sublayer receives the data request for the SDU of VC 3. Since there is no unused PHY bandwidth remaining, the SDU for VC 3 is added to the end of the $VC_3$ queue 38c of pending SDUs for VC 3, and VC 3 is placed on the TX-pending queue 36 of VCs with pending SDUs. Since the $t_E$ value for VC 3 is 0, which is lower than the $t_E$ value for VC 1 ($t_E$=8 for VC 1), VC 3 is inserted before VC 1 on the TX-pending queue 36 for VCs having SDU data requests pending, in accordance with step 66'.

$t_{now}$=5: The transmission of the SDU for VC 2 is completed. The parameters (X, t)=(0−5+4+2*1, 5)=(1, 5) are stored against VC 2. The transmission latency for this SDU is 2. There are no other VCs with SDUs in transmission. The TX-pending queue 36 of VCs having pending SDUs is scanned, finding VC 3 first. For VC 3, the condition X-$t_{now}$+t≦$\tau_S$ is met, so transmission may begin. The parameters (X, t)=(0, 5) are computed for VC 3. The period at which PDUs should be transmitted for the SDU of VC 3 is given by:

$$T = \max\left(T_S + \frac{X - \tau_S}{N - 1}, T_P, T_L\right) = \max\left(2 + \frac{0 - 3}{3 - 1}, 1, 1\right) = 1$$

The scheduling sublayer thus signals the ATM layer to set the cell rate of VC 3 to 100% of the PHY bandwidth, and will request the transmission of the SDU for VC 3 to the SAR.

$t_{now}$=8: The transmission of the SDU for VC 3 is completed. The parameters (X, t)=(0−8+5+2*3, 8)=(3, 8) are stored against VC 3. The transmission latency for this SDU is 4. There are no other VCs with SDUs in transmission. The TX-pending queue 36 of VCs having pending SDU data requests is scanned, finding VC 1. For VC 1, the condition X-$t_{now}$+t≦$\tau_S$ is met, so transmission may begin. The parameters (X, t)=(4−8+4, 8)=(0, 8) are computed for VC 1. The period at which PDUs should be transmitted for the SDU of VC 3 is given by:

$$T = \max\left(T_S + \frac{X - \tau_S}{N - 1}, T_P, T_L\right) = \max\left(2 + \frac{0 - 3}{3 - 1}, 1, 1\right) = 1$$

The scheduling sublayer thus signals the ATM Layer to set the cell rate of VC 1 to 100% of the PHY bandwidth, and will request the transmission of the second SDU for VC 1 to the SAR.

$t_{now}$=11: The transmission of the second SDU for VC 1 is completed. The parameters (X, t)=(0−11+8+2*3, 11)=(3, 11) are stored against VC 3. The transmission latency for this SDU is 7.

The average transmission latency per unit of SDU data is then (4*4+2*1+4*3+7*3)/(4+1+3+3)≈4.6.

Figure 17:
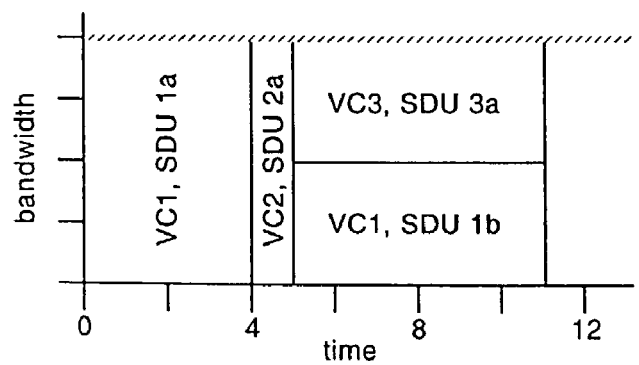
FIG. 17 is a bandwidth occupancy chart exemplifying a transmission pattern for the same non-real-time VBR VCs shown FIG. 16 but in accordance with the first preferred method.

Referring now to the bandwidth occupancy chart of FIG. 17, a contrasting example is now presented assuming the sorting steps 56' and 66' of the second preferred embodiment are not applied so that the TX-pending queue 36 of VCs with SDUs pending is maintained in simple first-in-first-out (FIFO) order as in the first preferred embodiment. In this case, after $t_{now}$=4, the order of the TX-pending queue 36 of VCs having pending SDUs would have VC 1 before VC 3. Accordingly, the following modifications would occur:

$t_{now}$=5: The transmission of the SDU for VC 2 is completed. The parameters (X, t)=(0−5+4+2*1, 5)=(1, 5) are stored against VC 2. The transmission latency for this SDU is 2. There are no other VCs with SDUs in transmission. The TX-pending queue 36 of VCs with pending SDUs is scanned, finding VC 1 first. For VC 1, the condition X-$t_{now}$+t≦$\tau_S$ is met, so transmission may begin. The parameters (X, t)=(4−5+4, 5)=(3, 5) are computed for VC 1. The period at which PDUs should be transmitted for the second SDU of VC 1 is given by:

$$T = \max\left(T_S + \frac{X - \tau_S}{N - 1}, T_P, T_L\right) = \max\left(2 + \frac{3 - 3}{3 - 1}, 1, 1\right) = 2$$

The scheduling sublayer thus instructs the ATM Layer to set the cell rate of VC 1 to 50% of the PHY bandwidth, and will request the transmission of the second SDU for VC 1 to the SAR.

Fifty percent of the PHY bandwidth remains unused, so the scanning of the TX-pending queue 36 of VCs with SDUs pending continues. VC 3 is found. For VC 3, the condition $X - t_{now} + t \leq \tau_S$ is met, so transmission may begin. The parameters $(X, t) = (0, 5)$ are computed for VC 3. The period at which PDUs should be transmitted for VC 3's SDU is given by:

$$T = \max\left(T_S + \frac{X - \tau_S}{N - 1}, T_P, T_L\right) = \max\left(2 + \frac{0 - 3}{4 - 1}, 1, 2\right) = 2$$

This time, the limitation of the bandwidth allocated to VC 3 is not imposed by GCRA conformance, but by the limited amount of PHY bandwidth remaining. The scheduling sublayer thus instructs the ATM Layer to set the cell rate of VC 3 to 50% of the PHY bandwidth, and will request the transmission of the SDU for VC 3 to the SAR.

$t_{now} = 11$: The transmission of the second SDU for VC 1 and the SDU for VC 3 are both completed. The parameters $(X, t) = (3 - 11 + 5 + 2*3, 11) = (3, 11)$ are stored against VC 1; the parameters $(X, t) = (0 - 11 + 5 + 2*3, 11) = (0, 11)$ are stored against VC 3. The transmission latency for both SDUs is 7.

The average transmission latency per unit of SDU data is then $(4*4 + 2*1 + 7*3 + 7*3)/(4 + 1 + 3 + 3) \approx 5.5$—worse than is achieved when the queue of VCs with SDUs pending is sorted by increasing $t_E$.

The discussion now turns to mathematically demonstrating that the second preferred embodiment produces a cell stream conformant to the nrt-VBR traffic contract. The analysis refers to the algorithms and discussion presented in ITU specification I.371 and especially in ATM Forum document AF-TM-0056.000, Appendix C, and uses a modified version of the notation in the "continuous-state leaky bucket algorithm" presented as an equivalent of the GCRA in AF-TM-0056.000 and I.371.

Let $t_K$ be the time at which the $K^{th}$ conforming cell was transmitted on an ATM virtual connection, let $X'_K$ be the trial value of the "leaky bucket counter" before the $K^{th}$ conforming cell was transmitted, and let $X_K$ be the value of the "leaky bucket counter" of the $GCRA(T_S, t_S)$ after the $K^{th}$ conforming cell was transmitted. If a conforming cell is transmitted at $t_K$, then the relationship between $X'_K$ and $X_K$ is given by:

$$X_K = X'_K + T_S \quad \{7\}$$

Suppose that at time $t'_{K+1}$, the SAR requests of the ATM layer that N ATM SDUs, that is, cells, be transmitted. The minimum values of $t_{K+1}$ and $t_{K+N}$—that is, the earliest time at which the first and last of the N cells can be transmitted—can be calculated such that compliance to the traffic contract is guaranteed. Further, it can be shown that if $N>1$, the N cells can be transmitted at some rate with constant period T. The linarity of the GCRA guarantees that if the first and last of N cells are conforming, and all cells between the first and last are equally spaced, then all cells between the first and last will also be conforming.

Note that transmitting cells at a fixed rate with period T is but one of many possible transmission scenarios that would be compliant to a given traffic contract.

First, the minimum value of $t_{K+1}$ is calculated:

$$t_{K+1} \geq \max(t'_{K+1}, t_K + T_P, t_K + X_K - \tau_S) \quad \{8\}$$

The second term of the max( ) function in {8} assures compliance with $GCRA(T_P, 0)$; the last term assures compliance with $GCRA(T_S, \tau_S)$. The first term is pro forma, and indicates that the ATM layer cannot send the first cell before the ATM layer user has requested it.

Before the first cell is transmitted at $t_{K+1}$, the value of $X'_{K+1}$ is given by:

$$X'_{K+1} = \max(X_K - t_{K+1} + t_K, 0) \quad \{9\}$$

The first term of the max( ) function in {9} corresponds to the case where there has not been sufficient time between $t_K$ and $t_{k+1}$ to "empty the bucket"; the second (zero) term of the max( ) function indicates that there has been sufficient time between $t_K$ and $t_{k+1}$ to "empty the bucket".

Next if $N>1$, assume there will be N−1 iterations through the GCRA after $t_{K+1}$ up to and including $t_{K+N}$, where each iteration is separated by equal time T. After these N−1 iterations, to conform to $GCRA(T_S, \tau_S)$, T must satisfy:

$$(N-1)(T_S - T) + X'_{K+1} \leq \tau_S \quad \{10\}$$

To conform to $GCRA(T_P, 0)$, T must satisfy $T = T_P$. Therefore, combining these constraints on T, obtain for the minimum value of T:

$$T \geq \max\left(T_S + \frac{X'_{K+1} - \tau_S}{N - 1}, T_P\right) \quad \{11\}$$

Similarly, after N−1 iterations through the GCRA, calculate $X_{K+N}$, according to:

$$X_{K+N} = NT_S - (N-1)T + X'_{K+1} \quad \{12\}$$

Note that {12} applies for all N, including N=1. For N=1, however, the need to calculate T is obviated by the multiplication of T by N−1.

When this algorithm is first run at time $t'_1$ for a particular VC, the values $t_0$ and $X_0$ are initialized to $t_0 = t'_1$ and $X_0 = 0$.

It can be shown that relaxing the condition that the N cells be transmitted with equal period T does not change the minimum time $t_{K+N}$, but the loss of constant T does cause the loss of the guarantee that cells between the first and Nth are conformant. Therefore, there is no benefit but there is some cost in spacing the N cells equally.

Referring back to the operation of the second preferred embodiment, the scheduling sublayer's per-VC parameter X immediately before the scheduling sublayer requests transmission of an AAL SDU of the SAR, corresponds to $X'_{K+1}$ in this analysis; the parameter t corresponds to $t_{K+1}$ in the analysis. Once the ATM layer has completed transmission of all SAR PDUs and has indicated this back to the scheduling sublayer, the scheduling sublayer's per-VC parameter X corresponds to $X_{K+N}$ in this analysis; the parameter t corresponds to $t_{K+N}$ in the analysis. Thus, {9} gives {1}, {12} gives {2}, {11} gives {3a}, and {8} gives the conditions stated in the second desired characteristic of the ATM layer equipment.

The minimum time at which the last conformant SAR PDU of an AAL SDU can be transmitted by the ATM layer is then $t_{K+N}$, where:

$$t_{K+N} = t_{K+1} + (N-1)T \quad \{13\}$$

$$= t_{K+1} + (N-1)*\max\left(T_S + \frac{X'_{K+1} - \tau_S}{N-1}, T_P\right)$$

$$= t_{K+1} + (N-1)*\max\left(T_S + \frac{\max(X_K - t_{K+1} + t_K, 0) - \tau_S}{N-1}, T_P\right)$$

The expansions in {13} follow from {11} and {9}. Now, suppose the following inequalities are satisfied:

$$X_K - t_{K+1} + t_K \geq 0 \quad \{14a\}$$

$$T_S + \frac{X'_{K+1} - \tau_S}{N-1} \geq T_P \quad \{14b\}$$

Then, {13} can be simplified to:

$$t_{K+N} = t_{K+1} + (N-1)\left(T_S + \frac{X_K - t_{K+1} + t_K - \tau_S}{N-1}\right) \quad \{15\}$$

$$= (N-1)T_S + X_K + t_K - \tau_S$$

The result of {15} means that $t_{K+N}$ is independent of $t_{K+1}$ provided conditions {14a} and {14b} are met. The inequalities {8}, {14a} and {14b} can be combined with the definition of $\tau_S$ and rearranged as:

$$X_K + t_K - \tau_S \leq t_{K+1} \leq X_K + t_K + \min((N-\text{MBS})(T_S - T_P), 0) \quad \{16\}$$

This gives the range over which the time of transmission of the first SAR PDU for an AAL SDU may vary, without affecting the time of transmission of the last SAR PDU for the AAL SDU and hence the latency of the AAL SDU. In other words, this is the time range illustrated in FIG. 15.

Those skilled in the art will appreciate that numerous modifications and variations may be made to the preferred embodiments without departing from the spirit and scope of the invention.

The invention claimed is:

1. Apparatus for allocating bandwidth for transmission of messages associated with a plurality of connections, said apparatus comprising:
   transmission equipment for receiving multiple messages from said plurality of connections, segmenting each received message into one or more data units, and multiplexing such data units from the plurality of connections into a single stream for transport over a physical interface at an output transmission rate;
   bandwidth allocation means associated with the transmission equipment for dynamically allocating a portion of the output transmission rate to transmit data units of a message associated with any connection of said plurality of connections; and
   a scheduler, connected to the bandwidth allocation means, for scheduling transfer of data units associated with different messages to the single stream and for allocating a substantially maximum permissible portion of the output transmission rate to transmitting the data units of the message associated with the any connection substantially at the time the message is transferred to the transmission equipment from the any connection in order to minimize interleaving of data units from different messages from the plurality of connections.

2. The apparatus according to claim 1, wherein:
   the transmission equipment comprises a segmentation means and a multiplexing means for respectively segmenting each received message into said data units and multiplexing said each received message into said single stream; and
   the scheduler transfers the messages to said single stream by one of (a) receiving the messages directly from the plurality of connections and transferring the messages to the segmentation means which substantially immediately transfers the messages to the multiplexing means, and (b) receiving the data units from the segmentation means and transferring groups of data units to the multiplexing means, wherein each such group corresponds to one of said messages.

3. The apparatus according to claim 2, wherein the scheduler is enabled to additionally set a transmission rate for the any connection for which the data units of the message associated with the any connection is in the process of being transmitted to the maximum permissible portion of the output transmission rate during transmission of data units of the message.

4. A data transmission method for transporting multiple messages associated with multiple connections from a network element over a network, said method comprising the steps of:
   segmenting each of said multiple messages of each of said multiple connections into transportable data units;
   scheduling transfer of the multiple messages from the network element;
   multiplexing the data units associated with the multiple messages into a single stream for transport over a transmission media to a destination; and
   assigning a maximum permissible amount of transmission media bandwidth over the transmission media to each of said multiple connections at the time one of said multiple message associated with the each of said multiple connections substantially begins to be transported over the transmission media, thereby minimizing interleaving of data units from the multiple messages associated with the multiple connections over the transmission media.

5. The method according to claim 4, wherein the scheduling step includes one of the following steps:
   (i) scheduling the transfer of groups of data units from the segmentation step to the multiplexing step, wherein each such group of data units corresponds to a one of said multiple messages, and
   (ii) scheduling the transfer of messages from the multiple connections to the segmentation step, wherein the segmentation step substantially immediately transfers the data units of the messages to the multiplexing step.

6. The method according to claim 5, wherein the bandwidth assignment step sets the bandwidth for a connection whose message is in the process of being transmitted to the maximum permissible amount during the transmission of the message.

7. Apparatus for transmitting ATM adaption layer (AAL) service data units (SDUs) associated with a plurality of connections, said apparatus comprising:
   segmentation means for segmenting each AAL SDU into one or more AAL segmentation and reassembly protocol data units (SAR PDUs);
   ATM layer means for multiplexing the SAR PDUs of various connections into a single stream having an output transmission rate;

physical transmission means, connected to the ATM layer means, for transporting the single stream of SAR PDUs over a physical interface;

bandwidth allocation means for dynamically allocating a portion of the output transmission rate to any connection of said plurality of connections; and a scheduler, connected to the bandwidth allocation means, for scheduling the transfer of SDUs to the ATM layer means, and for allocating a substantially maximum permissible portion of the output transmission rate to each connection substantially at the time one of its associated SDUs is submitted to the ATM layer means in order to minimize interleaving of SAR PDUs from various connections in the single stream.

8. The apparatus according to claim 7, wherein the scheduler transfers SDUs to the ATM layer means by one of (a) receiving the SDUs from AAL users and transferring the SDUs to the segmentation means, wherein the segmentation means substantially immediately transfers the SAR PDUs to the ATM layer means; and (b) transferring groups of SAR PDUs to the ATM layer means, wherein each such group corresponds to an SDU.

9. The apparatus according to claim 8, wherein the scheduler is enabled to set the transmission rate for a connection to the maximum permissible portion of the output transmission rate during the time an SDU associated with the connection is in the process of being transmitted over the physical interface.

10. Apparatus for transmitting ATM adaption layer (AAL) service data units (SDUs) associated with a plurality of connections, said apparatus comprising:

segmentation means, for segmenting each SDU into one or more AAL segmentation and reassembly protocol data units (SAR PDUs);

ATM layer means, for multiplexing the SAR PDUs into a single stream having an output transmission rate;

physical transmission means, connected to the ATM layer means, for transporting the single stream of SAR PDUs over a physical interface; and bandwidth allocation means, for dynamically allocating a portion of the output transmission rate to any connection; and scheduling means, connected to the bandwidth allocation means, for scheduling the transfer of SDUs to the ATM layer means, and for allocating a maximal portion of the output transmission rate to a connection while an SDU associated therewith is in the process of being transmitted by the ATM layer means.

11. The apparatus according to claim 10, wherein the scheduling means transfers messages to the ATM layer means by one of (a) receiving SDUs directly from AAL users and transferring the SDUs to the segmentation means which substantially immediately transfers the messages to the ATM layer means, and (b) receiving SAR PDUs from the segmentation means and transferring groups of SAR PDUs to the ATM layer means, wherein each such group corresponds to an SDU.

12. A method for preparing a message of a plurality of messages for transmission by a network element, said message being associated with a connection of a plurality of connections, said plurality of connections carrying said plurality of messages, said method comprising the steps of:

before determining whether to queue said message, determining whether said connection has another message that is being either transmitted or queued for transmission in a queue for said connection;

if said connection has said another message, queuing said message for transmission in the queue for said connection; and if said connection does not have said another message, determining whether there is bandwidth available for said connection for transmission of said message and if said bandwidth is available, assigning said connection a portion of said bandwidth for transmission of said message, wherein an execution of said method is performed for each connection of said plurality of connections.

13. The method for preparing a message of a plurality of messages for transmission by a network element according to claim 12, said method further comprising multiplexing each message of said plurality of messages into a single stream.

14. The method for preparing a message of a plurality of messages for transmission by a network element according to claim 13, wherein said multiplexing each said message of said plurality of messages into a single stream is executed sequentially through respective queues for each of said plurality of connections.

15. The method for preparing a message of a plurality of messages for transmission by a network element according to claim 13, wherein said portion of said bandwidth for transmission of said message is the lesser of:

(i) a pre-specified peak transmission rate for said connection; and (ii) a rate using substantially all available bandwidth for said connection.

16. The method for preparing a message of a plurality of messages for transmission by a network element according to claim 15, said method further comprising indicating when transmission of said message has been completed by said network element.

17. The method for preparing a message of a plurality of messages for transmission by a network element according to claim 15, said method further comprising increasing said portion of said bandwidth for one connection having a message being transmitted when bandwidth is freed from a transmitting connection after said transmitting connection completes transmission of its message, wherein said portion of said bandwidth is increased by an amount relating to bandwidth freed from said transmitting connection.

18. The method for preparing a message of a plurality of messages for transmission by a network element according to claim 13, wherein for connections of said plurality of connections which have a message waiting for transmission, each message associated with said connections is multiplexed into said single stream on a first-come, first-serve basis.

19. The method for preparing a message of a plurality of messages for transmission by a network element according to claim 13 said method further comprising preventing service starvation for connections of said plurality of connections which have a message waiting for transmission.

20. The method for preparing a message of a plurality of messages for transmission by a network element according to claim 19, wherein said preventing service starvation for connections of said plurality of connections selects connections which have a message waiting for transmission from said plurality of connections utilizing a round-robin selection scheme.

21. A communication device for preparing a plurality of messages associated with a plurality of connections for transmission by a network element, said plurality of connections associated with said communication device and carrying said plurality of messages, said communication device comprising:

transmission equipment for receiving said plurality of messages and for processing each message of said plurality of messages for transport over a physical interface at an output transmission rate utilizing a portion of bandwidth available to said communication device; and a scheduler being associated with said transmission equipment and being adapted to schedule said each message for transmission by said transmission equipment by:

prior to determining whether to queue said each message, determining whether a connection associated with said each message has another message that is being either transmitted or queued for transmission in a queue for said connection by said transmission equipment;

if said connection has said another message, queuing said message for transmission by said transmission equipment in the queue for said connection;

if said connection does not have said another message, determining whether there is bandwidth available of said bandwidth for said connection for transmission of said message and if said bandwidth is available, assigning said connection a portion of said available bandwidth for transmission of said message, wherein said scheduler processes said each message for said connection independently of messages or queues associated with other connections of said plurality of connections and initiates processing of each said message after receipt thereof.

22. The communication device according to claim 21, wherein said portion of said bandwidth for transmission of said message is the lesser of:

(i) a pre-specified peak transmission rate for said connection; and (ii) a rate using substantially all available bandwidth for said connection.

23. The communication device according to claim 22, wherein said transmission equipment is further adapted to segment said each message of said plurality of messages into at least one data unit and to multiplex said at least one data unit into a single stream for transport over said physical interface.

24. The communication device according to claim 23, wherein said transmission equipment multiplexes messages waiting for transmission into said single stream on a first-come, first-serve basis.

25. The communication device according to claim 24, further comprising a service starvation module for connections of said plurality of connections which have a message waiting for transmission.

26. The communication device according to claim 25, wherein said service starvation module schedules connections of said plurality of connections which have a message waiting for transmission for transmission on a round-robin basis.

27. The communication device according to claim 26, wherein said transmission equipment further comprises an indicator module to generate an indication when transmission of said message has been completed by transmission equipment.

28. The communication device according to claim 26, wherein said scheduler further comprises a bandwidth adjustment module for increasing said portion of said bandwidth for one connection of said plurality of connections having a message being transmitted when bandwidth is freed from a transmitting connection of said plurality of connections after said transmitting connection completes transmission of its message, wherein said bandwidth adjustment module increases said portion of said available bandwidth by an amount relating to bandwidth freed from said transmitting connection.

29. A method for preparing a message of a plurality of messages for transmission by a network element, said message being associated with a connection of a plurality of connections, said plurality of connections carrying said plurality of messages, said method comprising the steps of:

segmenting each message of said plurality of messages of each connection of said plurality of connections into at least one data unit;

multiplexing said at least one data unit into a single stream for transmission to a destination; and prior to determining whether to queue said each message, determining whether said connection has another message that is being either transmitted or queued for transmission in a queue for said connection, and if said connection has said another message, queuing said message for transmission in said queue for said connection; otherwise, if said connection does not have said another message, determining whether there is bandwidth available for said connection for transmission of said message and if said bandwidth is available, assigning said connection a portion of said bandwidth for transmission of said message, said portion being the lesser of:

(i) a pre-specified peak transmission rate for said connection; and (ii) a rate using substantially all available bandwidth allocated to a service class to which said connection belongs.

30. The method for preparing a message of a plurality of messages for transmission by a network element according to claim 29, wherein said multiplexing said at least one data unit into said single stream occurs substantially immediately after said segmenting said each message of said plurality of messages.

31. The method for preparing a message of a plurality of messages for transmission by a network element according to claim 30, said method further comprising indicating when transmission of said message has been completed.

32. The method according to claim 31, said method further comprising increasing said portion of said bandwidth for one connection of said plurality of connections having a message being transmitted when bandwidth is freed from a transmitting connection of said plurality of connections after said transmitting connection completes transmission of its message, wherein said portion of said bandwidth is increased by an amount relating to bandwidth freed from said transmitting connection.

\* \* \* \* \*

UNITED STATES PATENT AND TRADEMARK OFFICE
CERTIFICATE OF CORRECTION

PATENT NO.         : 7,295,558 B2                                      Page 1 of 1
APPLICATION NO. : 10/126527
DATED              : November 13, 2007
INVENTOR(S)        : Ken Dubuc It is certified that error appears in the above-identified patent and that said Letters Patent is hereby corrected as shown below:

1. Column 14, line 58: Replace the word "Vcs" with the word --VCs--.

2. Column 17, line 61: Replace the word "linarity" with the word --linearity--.

3. Claim 4, column 20, line 37: Replace the word "message" with the word --messages--.

4. Claim 19, column 22, line 55: Replace the number "13" with the number (followed by a comma) --18,--.

Signed and Sealed this

Fifteenth Day of April, 2008

JON W. DUDAS
*Director of the United States Patent and Trademark Office*